United States Patent
Hughes et al.

(10) Patent No.: US 9,456,243 B1
(45) Date of Patent: Sep. 27, 2016

(54) METHODS AND APPARATUS FOR PROCESSING TIME-BASED CONTENT

(75) Inventors: Gary Hughes, Chelmsford, MA (US); Michael A. Falco, Swampscott, MA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1180 days.

(21) Appl. No.: 10/730,365

(22) Filed: Dec. 8, 2003

Related U.S. Application Data

(60) Provisional application No. 60/476,673, filed on Jun. 6, 2003, provisional application No. 60/476,705, filed on Jun. 6, 2003.

(51) Int. Cl.
*G06F 15/16* (2006.01)
*H04N 21/44* (2011.01)

(52) U.S. Cl.
CPC .............. *H04N 21/44016* (2013.01)

(58) Field of Classification Search
USPC ........................................ 709/246, 247, 231
See application file for complete search history.

(56) References Cited

U.S. PATENT DOCUMENTS

| | | | |
|---|---|---|---|
| 5,021,893 A | 6/1991 | Scheffler | |
| 5,041,921 A | 8/1991 | Scheffler | |
| 5,233,477 A | 8/1993 | Scheffler | |
| 5,365,381 A | 11/1994 | Scheffler | |
| 5,418,654 A | 5/1995 | Scheffler | |
| 5,502,601 A | 3/1996 | Scheffler | |
| 5,859,660 A | 1/1999 | Perkins et al. | |
| 5,900,830 A | 5/1999 | Scheffler | |
| 5,956,088 A | 9/1999 | Shen et al. | |
| 6,031,960 A | 2/2000 | Lane | |
| 6,064,794 A * | 5/2000 | McLaren et al. | 386/68 |
| 6,101,195 A | 8/2000 | Lyons et al. | |
| 6,137,834 A | 10/2000 | Wine et al. | |
| 6,169,843 B1 * | 1/2001 | Lenihan et al. | 386/46 |
| 6,233,238 B1 | 5/2001 | Romanowski et al. | |
| 6,233,389 B1 * | 5/2001 | Barton et al. | 386/46 |

(Continued)

FOREIGN PATENT DOCUMENTS

| | | |
|---|---|---|
| EP | 0989756 A2 | 3/2000 |
| JP | H10200854 A | 7/1998 |

(Continued)

OTHER PUBLICATIONS

Wikipedia, The Free Encyclopedia, "MPEG-2", Jun. 1, 2006, pp. 1-9, http://en.wikipedia.org/wiki/MPEG-2, Wikipedia Foundation, Inc.

(Continued)

*Primary Examiner* — Glenford Madamba
(74) *Attorney, Agent, or Firm* — Lori Anne D. Swanson

(57) ABSTRACT

An analyzer analyzes portions of a logical data stream including data content received from a source. Based on analyzing the data content (e.g., data content formatted according to Moving Picture Experts Group (MPEG)) received from the source, the analyzer generates metadata associated with multiple analyzed portions of the logical data stream. The metadata supports manipulation of how the logical data stream is presented when at least a portion of the data content of the logical data stream is later presented to a receiver for play back in a mode different than the original content (e.g., play back includes fast forwarding, rewinding, and/or pausing.

64 Claims, 12 Drawing Sheets

(56) References Cited

U.S. PATENT DOCUMENTS

| | | |
|---|---|---|
| 6,263,154 B1 | 7/2001 | Scheffler |
| 6,330,286 B1 | 12/2001 | Lyons et al. |
| 6,343,346 B1 | 1/2002 | Olnowich |
| 6,710,814 B1 | 3/2004 | Ueno et al. |
| 6,741,290 B1 | 5/2004 | Wells |
| 6,744,815 B1 | 6/2004 | Sackstein et al. |
| 6,766,360 B1 | 7/2004 | Conway et al. |
| 6,771,703 B1 | 8/2004 | Oguz et al. |
| 6,871,006 B1 | 3/2005 | Oguz et al. |
| 6,892,022 B1 | 5/2005 | Bonfiglio et al. |
| 6,937,770 B1 | 8/2005 | Oguz et al. |
| 6,993,081 B1 | 1/2006 | Brunheroto et al. |
| 7,023,924 B1 | 4/2006 | Keller et al. |
| 7,027,713 B1 | 4/2006 | Hallberg |
| 7,031,348 B1 | 4/2006 | Gazit |
| 7,096,481 B1 | 8/2006 | Forecast et al. |
| 7,240,143 B1 | 7/2007 | Scheffler et al. |
| 7,298,741 B2 | 11/2007 | Hung |
| 7,327,790 B1 | 2/2008 | Bretl et al. |
| 7,382,805 B1 | 6/2008 | Raza et al. |
| 8,689,267 B2 | 4/2014 | Hunt |
| 2001/0013123 A1 | 8/2001 | Freeman et al. |
| 2002/0085592 A1 | 7/2002 | Ono et al. |
| 2002/0087976 A1 | 7/2002 | Kaplan et al. |
| 2002/0128823 A1* | 9/2002 | Kovacevic .................... 704/201 |
| 2002/0170067 A1 | 11/2002 | Norstrom et al. |
| 2003/0043924 A1 | 3/2003 | Haddad et al. |
| 2003/0077071 A1 | 4/2003 | Lin et al. |
| 2003/0118243 A1 | 6/2003 | Sezer et al. |
| 2003/0185238 A1* | 10/2003 | Strasser et al. ............... 370/473 |
| 2004/0002969 A1 | 1/2004 | Perng et al. |
| 2004/0117858 A1 | 6/2004 | Boudreau et al. |
| 2005/0004940 A1 | 1/2005 | Ikeda |
| 2005/0010960 A1* | 1/2005 | Kitazawa et al. ............ 725/117 |
| 2005/0180735 A1 | 8/2005 | Oshima et al. |
| 2006/0093045 A1* | 5/2006 | Anderson et al. ....... 375/240.28 |
| 2006/0093315 A1* | 5/2006 | Kelly et al. ..................... 386/52 |
| 2006/0146780 A1 | 7/2006 | Paves |
| 2006/0146850 A1 | 7/2006 | Virdi et al. |
| 2007/0140647 A1 | 6/2007 | Kusunoki et al. |
| 2007/0283380 A1 | 12/2007 | Aoki et al. |
| 2008/0059724 A1 | 3/2008 | Stifter, Jr. |
| 2008/0170687 A1 | 7/2008 | Moors et al. |
| 2008/0304810 A1 | 12/2008 | Rijckaert et al. |
| 2009/0077581 A1 | 3/2009 | Kim et al. |
| 2009/0164652 A1 | 6/2009 | Slobotskoy et al. |
| 2010/0129056 A1 | 5/2010 | Connery et al. |

FOREIGN PATENT DOCUMENTS

| | | | |
|---|---|---|---|
| JP | 11112452 A | 4/1999 | |
| JP | 2005519525 A | 6/2005 | |
| JP | 2006121601 A | 5/2006 | |
| JP | 2006-121601 | 11/2006 | |
| WO | 9914955 A1 | 3/1999 | |
| WO | 2006062551 A1 | 6/2006 | |

OTHER PUBLICATIONS

Office Action, Japanese App. No. 2009-539457 (Foreign Text and English Translation), Oct. 4, 2011.
PCT Search Report & Written Opinion, Re: Application #PCT/US07/85757; Nov. 28, 2007.
Office Action, U.S. Appl. No. 11/605,514, Apr. 19, 2011.
Office Action, U.S. Appl. No. 11/605,514, Nov. 24, 2010.
Office Action, U.S. Appl. No. 11/605,514, May 11, 2010.
Office Action, U.S. Appl. No. 11/605,514, Sep. 21, 2009.
Office Action, Canadian App. No. 2,670,688, Apr. 12, 2011.
Office Action mailed Aug. 30, 2012 in Canadian Patent Application No. 2,706,715.
Search and Examination Report mailed Nov. 16, 2012 in Great Britain Patent Application No. 1219115.1.
Examination Report mailed Jan. 31, 2012 in Great Britain Patent Application No. GB1008168.5.
Examination Report mailed Aug. 22, 2012 in Great Britain Patent Application No. GB1008168.5.
Examination Report mailed Nov. 15, 2012 in Great Britain Patent Application No. GB1008168.5.
PCT International Search Report & Written Opinion, Re: Application No. PCT/US2007/085757, dated Apr. 24, 2008.
Birch, C. H., "MPEG Splicing and Bandwidth Management", Broadcasting Convention, Doc No. XP006508813, Sep. 1997.
Anonymous, "Multiple Stream Decode Information Caching at Digital Video Decode Points for Fast Source Switching", Mason Publications, Research disclosure, Mar. 2003.
Ward C., et al., "Seamless Splicing for MPEG-2 Transport Stream Video Servers", SMPTE Motion Imaging Journal, Society of Motion Picture and Television Engineers, Dec. 1999.
Supplementary European Search Report for EP07854808, mailed on Jan. 24, 2014.
NSE4256 Network Search Engine, NETLOGIC, Revision 2.0, pp. 1-44, 2002.
Notice of Allowance mailed Jul. 31, 2012 in Canadian Patent Application No. CA 2670688.
Office Action mailed Apr. 12, 2011 in Canadian Patent Application No. CA 2670688.
Non Final Office Action mailed Jul. 5, 2006 in U.S. Appl. No. 10/730,748, Robert G. Scheffler, filed Dec. 8, 2003.
Non Final Office Action mailed Oct. 26, 2006 in U.S. Appl. No. 10/730,748, Robert G. Scheffler, filed Dec. 8, 2003.
Notice of Allowance mailed Feb. 26, 2007 in U.S. Appl. No. 10/730,748, Robert G. Scheffler, filed Dec. 8, 2003.
International Search Report for International Application No. PCT/US2008/087070 mailed on Feb. 4, 2009.
Office Action, Japanese Application No. 2009-539457, (Foreign Text and English Translation), May 25, 2012.

* cited by examiner

METHODS AND APPARATUS FOR PROCESSING TIME-BASED CONTENT

RELATED APPLICATIONS

This application claims the benefit of U.S. Provisional Application No. 60/476,673 entitled "METHODS AND APPARATUS FOR TIME BASED MATERIAL STREAM MANIPULATION," filed on Jun. 6, 2003 and U.S. Provisional Application No. 60/476,705 entitled "METHODS AND APPARATUS FOR IMPLEMENTING A STORAGE MEMORY SYSTEM WITH MULTIPLE ACCESS PORTS AND MEMORY ADDRESS VIRTUALIZATION," also filed on Jun. 6, 2003, the entire teachings of which are incorporated herein by this reference. This application is also related to U.S. patent application Ser. No. 10/730,748 entitled "METHODS AND APPARATUS FOR STORAGE OF DATA," filed on the same date as the present application, the entire teachings of which are also incorporated herein by this reference.

FIELD OF THE INVENTION

Embodiments of the present invention support navigation, in general, and Time Stamp (TS) manipulation of streaming time based material to facilitate the efficient processing or generation of large numbers of simultaneous data streams

BACKGROUND

Multimedia content is a type of time based material and consists of multiple content elements that may be continuous content (e.g., video, audio) or non-continuous content (e.g. text, html for web pages) which must be presented at specified times with respect (or referenced) to a common system clock. This time reference is generally associated with one of the elements and is used to ensure that the presentation of the content elements, or single components of content, are synchronized at playback. For example, time stamps ensure that audio and subtitle elements are synchronized with the video element of a movie.

In order for a content source or other device to stream multimedia content over a communication path, such as a network or a satellite link, the elements are broken into presentation units, each with associated time stamps. The resulting presentation units are encapsulated in one or more packets for transmission. Typically, these packets are interleaved into a continuous packetized stream such that synchronized content elements are delivered to the proper receiving device in a timely fashion.

Data packets differ depending on the communication medium over which data content is transmitted. For example, multimedia data content may include massive amounts of data. Streaming systems cannot always rely on buffering data in the receiving device, or on the communication media carrying the data to maintain synchronization. In general, content must not be delivered too early or too late.

When streaming from a content server, such as equipment that delivers time based content to a receiving device, it is often necessary to update or regenerate the time stamps associated with the content in order to maintain valid streams. Existing content servers, implement time stamp updates by searching the component streams for the relevant time stamp as the content is streamed out. In many instances, the individual content elements are separated, updated with new time stamps and recombined to form a new packetized stream with the correct timing. This process must be performed in real-time for each active stream in the system and reoccurs for each request for the stream. As the active stream count from a server increases, the amount of work required also increases. A conventional approach can not support this level of processing and fails to maintain valid streams and results in poor presentation quality.

If navigation is supported, the content server will typically build or obtain an index or table of access points prior to content becoming available for streaming. Again, this process must be performed in real-time for each active stream. This is normally performed by a software manager or hardware manager of the time based material stream, which may be referred to as a stream processor. The processing and memory demands associated with conventional stream processing techniques limits the number of streams and stream throughput that can be supported by a given content server. In some cases, specialized stream processors may be used to assist with stream processing.

SUMMARY

Unfortunately, there are deficiencies associated with conventional techniques of streaming multimedia data content. For example, existing time based material systems are costly to scale, inefficient during navigation, and require large memory and processor overhead. They may produce unpredictable results from the receiving device due to the lack of steady, consistent timing and a legal stream (e.g., a data stream that may be properly played back at a receiving device).

To overcome these and other deficiencies, one embodiment of the present invention includes a technique for processing media data. Original or first content is stored in a buffer encoded according to a specific media encoding standard. An analyzer then analyzes the first content to detect sets of related first content portions, each set defining a presentation group (e.g., multiple blocks of data). For a plurality of presentation groups in the first content, the analyzer generates a respective private transport packet that includes metadata derived from at least some of the first content portions in the presentation group, the metadata containing information allowing modified production of the first content in a manner that is different than the first content but still follows the rules defined by the first content encoding standard. After generating the private transport packets, the analyzer stores the first content and the corresponding metadata interleaved together as enhanced or second content.

According to another embodiment, the present invention includes a technique of processing information. For example, an analyzer analyzes portions of a logical data stream including data content received from a source. Based on analyzing the data content (e.g., data content formatted according to Moving Picture Experts Group (MPEG)) received from the source, the analyzer generates metadata associated with multiple analyzed portions of the logical data stream. The metadata supports manipulation of how the logical data stream is presented when at least a portion of the data content of the logical data stream is later presented to a receiver for play-back.

In more specific and potentially other independent embodiments, metadata generated by the analyzer may support navigation among different portions of the logical data stream in response to commands received from remote users playing back at least a portion of the logical data stream in real-time. For example, the generated metadata enables serial streaming of non-contiguous portions of the logical data stream in response to commands from remote users requesting presentation of the logical data stream in a different manner than originally supported by a content format of the logical data stream. A server may transmit video data (e.g., content data) to a display that displays a corresponding real-time video image to a viewer. The viewer may transmit commands to fast forward, rewind, pause, play etc. a corresponding program (e.g., logical data stream) to view different sections similar to functions supported by a VCR or DVD player. Upon receipt of a viewer's command, the server of the serial stream utilizes the metadata to navigate through portions of the logical data stream so that the appropriate portions are transmitted from the server to the viewer.

According to yet other embodiments, the analyzer as previously discussed creates at least one retrievable file formatted to include analyzed portions of the logical data stream. Generated metadata includes a pointer (or pointers) for storage in proximity to a first portion of the logical data stream. A pointer may identify a relative location of a second portion of the logical data stream. Based on this technique, pointers associated with the logical data stream may be used to navigate from one portion of the logical data stream to another.

In one application, multiple pointers are interleaved between portions of the logical data stream at corresponding access points in the logical data stream, which includes a data field in a known position (e.g., a predetermined data field) relative to the first portion of the logical data stream. Storage of pointers in this way enables a processor streaming the logical data stream to navigate about more quickly in the logical data stream because the pointers are located in known data fields. The first portion and second portions of the logical data stream may be contiguous to each other such that the pointers are interleaved among portions of the logical data stream.

One use of the pointers is to navigate among portions of data content during playback. For example, a user may be playing back data content such as video data retrieved from a semiconductor chip-based memory storage system (e.g., a server). Notably, the user may play the video data back in real-time upon receipt of contents associated with the data stream. Other modes include trick modes such as fast forward, rewind, pause, etc. For example, the user may generate a command to fast forward ahead in the logical data stream. In response to receiving such a command, the server device utilizes the pointers to determine which future portion of the logical data stream to transmit to a user in response to receiving the fast forward navigation command. Different fast forward or rewind speeds are achievable based on use of pointers pointing to other portions further ahead (or behind) in the logical data stream. In this way, the transmitter device generating and maintaining a flow of the logical data may be controlled by a remotely located user.

Other or additional information is optionally interleaved among portions of the logical data stream. For example, data fields may be reserved in relation to portions of the logical data stream for inserting additional types of metadata such as time stamps, which are used to support play back of the logical data stream at a receiver. Thus, a combination of the logical data stream and meta data results in an enhanced logical data stream. Prior to transmission of data content associated with the logical data stream, the transmitter may remove the metadata from the enhanced logical stream so that content data and proper control information (for displaying the content data such as a video data) are transmitted to a user. Meta data associated with the enhanced logical data stream may include generated offset information identifying a location of other meta data. For example, meta data such as offset information stored in the enhanced logical data stream may include offsets identifying a location of time stamps supporting playback of the enhanced logical data stream. In addition to offset information, the meta data may include content dependent information to support different types of presentation modes such as fast forward, rewind, and pause.

Another embodiment of the present invention includes a technique of presenting content to a client device. For example, a processor receives second content containing first content portions arranged as a series of presentation groups, at least some of the presentation groups including a respective (associated) private transport packet containing metadata that allows modified production of the first content in a manner that is different than a first production of the first content defined by the first content format. The processor produces a content stream for presentation to the client device using at least one of the private transport packets associated with at least some of the presentations groups of the first content portions in the second content to produce a modified production of at least one of the first content portions in a manner that is different that the first production of the first content defined by the first content format. An example would be skipping a scene in a movie with graphic or violent content, this could be used to edit or sensor a movie to make it suitable for younger viewers. A PG-13 movie could have metadata to allow skipping specific scenes, yielding a PG movie.

Yet another embodiment of the invention also includes a method and apparatus for presenting data to a client. A stream processor (e.g., a server) retrieves an enhanced logical data stream including data content and associated metadata, the metadata enabling manipulation of how the data content of the enhanced logical data stream is presented to the client device. Depending on input from the client device indicating how to present the data content, the stream processor generates a content stream including the data content to the client. The stream processor may navigate among different portions of the logical data stream in response to commands received from remote users each playing back at least a portion of the logical data stream substantially in real-time. The metadata enables serial streaming of non-contiguous portions of the logical data stream in response to commands from remote users requesting presentation of the logical data stream in a different manner than originally supported by a content format of the logical data stream.

Capabilities of the streaming processor may be expanded to support streaming different portions of data content from the same logical data stream independent of each other. For example, the streaming processor may stream first portions of an enhanced logical data stream for presentation of corresponding data content to a first client while simultaneously streaming second, different portions of the same logical data stream for presentation of corresponding data content to another client, and so on. In this way, the receiving clients may independently view different sections of video data at different times, such as removing sensitive scenes from some viewers content. This technique is an advancement over conventional methods of broadcasting television programs in which the multiple viewers are restricted to watching the same program at the same time.

The streaming processor may occasionally inject other content (e.g., similar to advertising segments such as commercials or infomercials on television) in between presenting portions of data content to a client. In one application, a viewer (e.g., client) playing back the logical data stream received from the stream processor may be able to navigate throughout a program (e.g., the logical data stream) but may be required to display commercials that are substantially presented in real time regardless of input commands from the client. Each of these two data streams, the program and the commercial, can have their own unique meta data contained within. This allows different data streams to have two different sets of rules, capabilities, or navigation pointers.

As previously discussed, one embodiment of the invention includes meta data interleaved at specified partitions (e.g., in allocated data fields Private Transport Packets) among segments of real-time video data. The meta data may include time stamps for proper play back of the video data at a receiver with respect to a real-time clock. To aid in locating the time stamps, offset information may be stored in a specified data field identifying where corresponding time stamps reside. Meta data in one partition may also include pointers identifying a location of other partitions. For example, one pointer in a given partition may identify the location of the next partition (including meta data) in the logical data stream. In a similar way, additional pointers in the given partition may identify locations of yet other following partitions or previous partitions in the logical data stream. As previously discussed, one use of pointers is to navigate throughout a logical data stream for play back of video data at different speeds.

During operation, the stream processor may receive input commands from a client identifying a presentation mode requested by the client for receiving data content of a particular stream. For real-time streaming of data content, the stream processor transmits successive portions of the logical data stream for playback by the client. In the event that the client generates a command to advance or fall back in the logical data stream, the stream processor utilizes the pointers interleaved in the enhanced logical data stream to jump ahead or behind in the logical data stream. In addition to navigation, the stream processor utilizes metadata stored in the enhanced logical data stream to determine whether to suppress playing back an audio signal of the content stream.

Yet other embodiments of the invention described herein address the limitations associated with conventional methods of maintaining data streams. For example, embodiments of the present invention enable content servers to scale to a much larger number of streams and produce higher quality packetized streams. In general, this is achieved by content ingest, storage and manipulation to produce a final formatted and packetized stream format, thus avoiding the need to separate and reconstruct the packetized stream for each active stream. During the content ingest process, the content elements within the packetized stream are analyzed to locate time stamp and access point information. By performing this process at ingest, it occurs only once per content item, regardless of the number of times the content is streamed to output.

Time stamp offsets, access points, and other information resulting from this analysis may be packetized or formatted into Private Transport Packets (PTPs), which are interleaved into the packetized stream as it is sent to content storage resulting in an enhanced packetized stream. This approach means that the packetized stream is self-contained and ensures that critical information arrives at the stream processor immediately before it is required. The resulting enhanced packetized stream is particularly suitable for processing by dedicated stream processors which can offload the primary processor. These private transport packets are removed from the enhanced packetized stream immediately prior to transmission.

While streaming content, a stream processor uses the data stored in the private transport packet to rapidly locate time stamps and other information without having to search through the packetized stream. In addition to time stamps, a private transport packet may include one or multiple pointers to locations of other private transport packets which correspond to access points in the stream, enabling rapid and efficient navigation without requiring external indices or other information. Examples of navigation include fast forward, rewind, pause or other 'trick-mode' viewing, chapter makers, etc. Private transport packets may also include content dependent information to assist with navigation or other operations that are dependant upon the type of compression, if any, in use. For the specific case of MPEG-2 encoded video, the content dependent information is used to generate navigation streams that do not depend upon optional or proprietary extensions to MPEG-2 in the receiving device.

One embodiment of the present invention is directed to a computer program product that includes a computer readable medium having instructions stored thereon for producing an enhanced logical data stream including meta data. The instructions, when carried out by a processor of the data communication device, cause the processor to perform the steps of: i) analyzing portions of a logical data stream including data content received from a source; and ii) based on analyzing the data content received from the source, generating metadata associated with multiple analyzed portions of the logical data stream, the metadata being used to support manipulation of presenting the logical data stream when the data content of the logical data stream is later presented to a receiver for play back.

Another embodiment of the present invention is directed to a computer program product that includes a computer readable medium having instructions stored thereon for presenting data content to a client. The instructions, when carried out by a processor of the data communication device, cause the processor to perform the steps of: i) retrieving an enhanced logical data stream including data content and associated metadata, the metadata enabling manipulation of how the data content of the enhanced logical data stream is presented to the client device; ii) generating a content stream including the data content depending on input from the client device indicating how to present the data content; and iii) presenting the content stream to the client.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily drawn to scale, emphasis instead being placed upon illustrating the principles of the present invention.

DETAILED DESCRIPTION

One embodiment of the invention ingests packetized time based material, referred to as content for the remainder of this document, and manipulates it to add functionality readying the enhanced content for storage. When content is requested, the invention reproduces the enhanced content (that contains meta data) to support functionality such as alternate speed playback, removes the content enhancements, and outputs the content.

Content to be streamed is created as a group of packets, or packetized stream, regardless of the type of time based material being streamed. This is done so that multiple contents can be interleaved in one stream for transport, but remain able to be decoded individually and displayed properly on the receiving end or ends of the stream. An example of this is having one stream, containing many interleaved movies, being created at the local cable television office and outputted to a neighborhood. Once in the neighborhood, the proper shows are decoded and presented by a receiving device, (such as a set top box) in the proper order and in the proper homes.

The metadata which is interleaved with content supports functionality including the ability to "disallow" fast forward through certain segments, such as advertising, legal notices, etc. This metadata can be used for many types of file manipulation. This invention could also output content using a different protocol from the one used during input.

Figure 1:
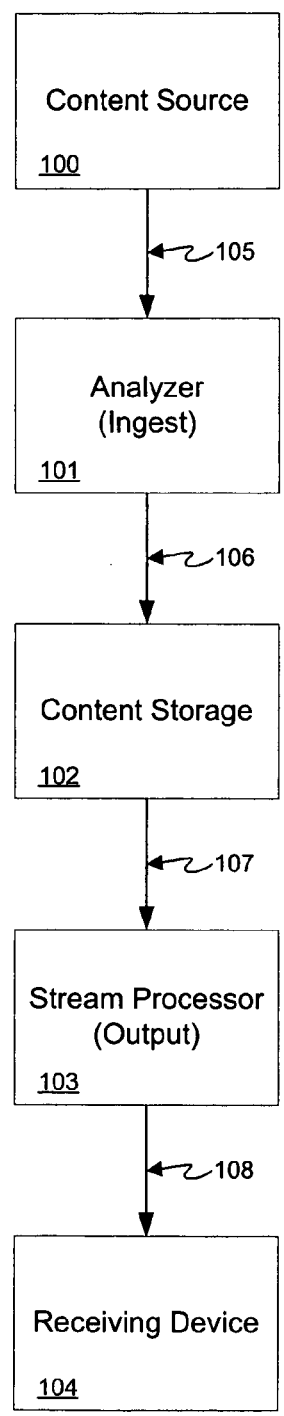
FIG. 1 is a block diagram of a high level flow of information from ingest to output according to an embodiment of the present invention.

Referring to FIG. 1, the analyzer 101 pulls content (such as a stream of multimedia data) via connection 105 from a content source 100, interleaves content with metadata creating enhanced content, and outputs the enhanced content via connection 106 to content storage 102 where it remains until it is requested for play. When requested for play, stream processor 103 pulls the enhanced content via connection 107 from content storage 102, removes the metadata, and outputs the original content using connection 108 to an appropriate receiving device 104.

In one embodiment, analyzer 101 ingests content already in packetized stream format for transmission and stream processor 103 outputs content using the same packetized stream format with updated time stamps. This embodiment does not need to deconstruct on input and reconstruct on output. Thus, these techniques require much less processing and memory overhead during streaming and provides superior scalability to the methods currently used.

One embodiment for use of the system as shown in FIG. 1 can be found in U.S. patent application Ser. No. 10/730,748 entitled "METHODS AND APPARATUS FOR STORAGE OF DATA," filed on an even date herewith along with the present application, the entire teachings of which are incorporated herein by this reference. For example, port interface processor 601 (in the referenced application) optionally supports transmission of streaming data similar to stream processor 103 and module CPU 603 (in the referenced application) optionally produces the enhanced data stream including PTP information similar to analyzer 101.

Figure 2:
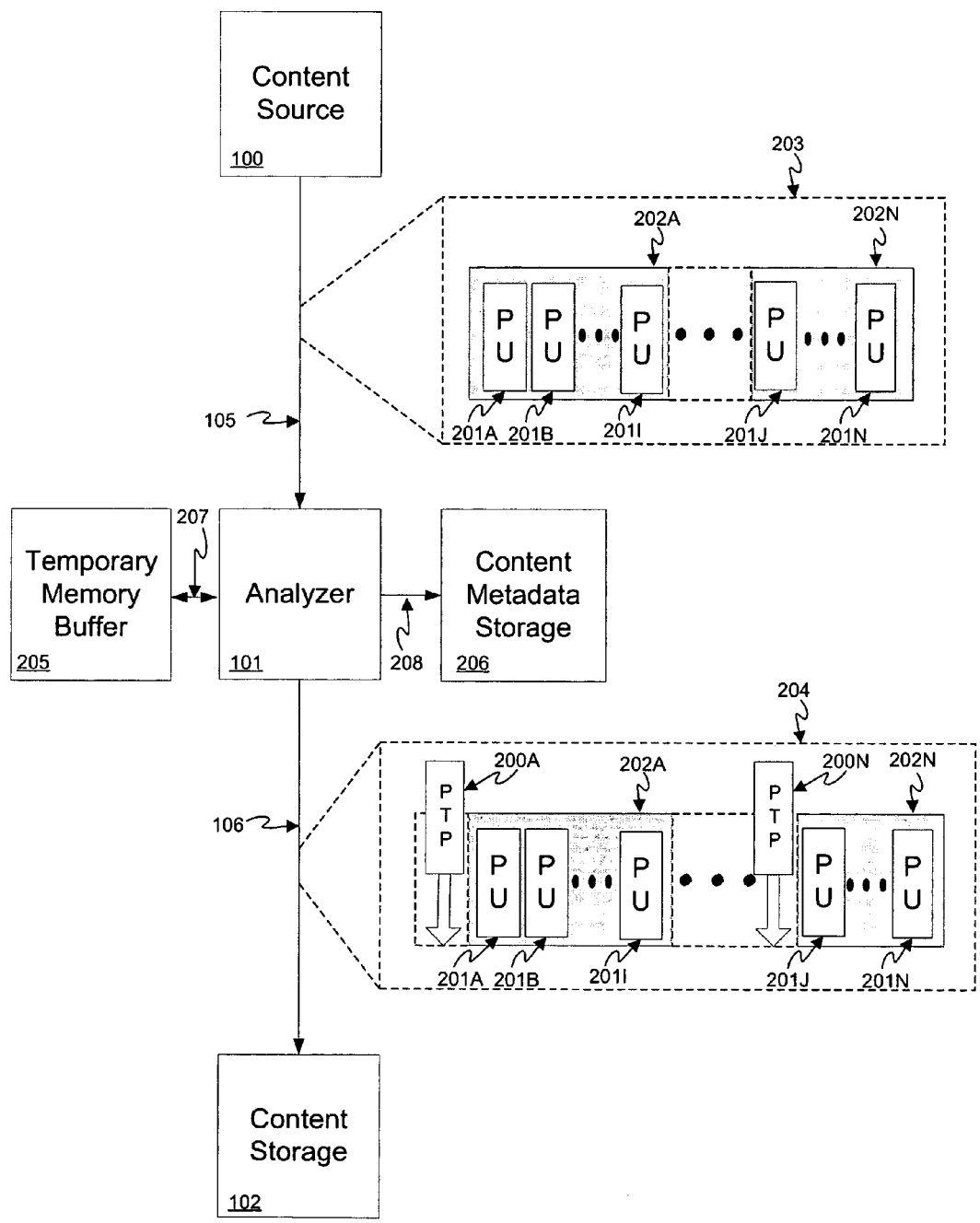
FIG. 2 is a block diagram of content enhancement during an ingest process according to an embodiment of the present invention.

As shown in FIG. 2, the ingest process involves the content source 100 providing original content 203 (such as a stream of audio/video data) via connection 105 to analyzer 101, which creates enhanced content 204. Analyzer 101 examines content (such as presentation units 201) to build the PTPs 200A-200N (200) which themselves include offsets in the stream, normal play time of the stream, and pointers to future and past PTPs to allow for highly efficient content navigation.

Presentation groups 202A-202N (202) consist of presentation units 201A-201N (201), which may be audio, video, or other types of media. In general, PTPs 200 are placed before the appropriate presentation group 202 so that the presentation of the content after navigation starts with a new presentation group. The pointers to distant PTPs support multiple speeds of content navigation such as fast forward and rewind. This is described in detail later in this document. PTPs 200 are generally used internally (to stream processor 103) and are normally removed before content is outputted. Depending on the application, the PTP metadata could be left in the output data stream for navigation ability in a device that sits downstream from the stream output processor. An example would be a receiving device that implements its own content navigation. Such a device would not need to do its own content analysis to determine valid content navigation points, but could merely store the embedded PTP and use it for navigation instead. A temporary memory buffer 205 stores packets from the nearby presentation groups while each PTP is being created. Using connection 207, the temporary memory buffer 205 is used so that past and future addresses can be written into the PTP before the entire presentation group is stored. Contents data and associated PTP are written to content storage 102 using connection 106. Using connection 208, content metadata 206 is stored and contains information about the stream, including bit stream rates. The enhanced content 204 is then ready to be streamed.

Figure 3:
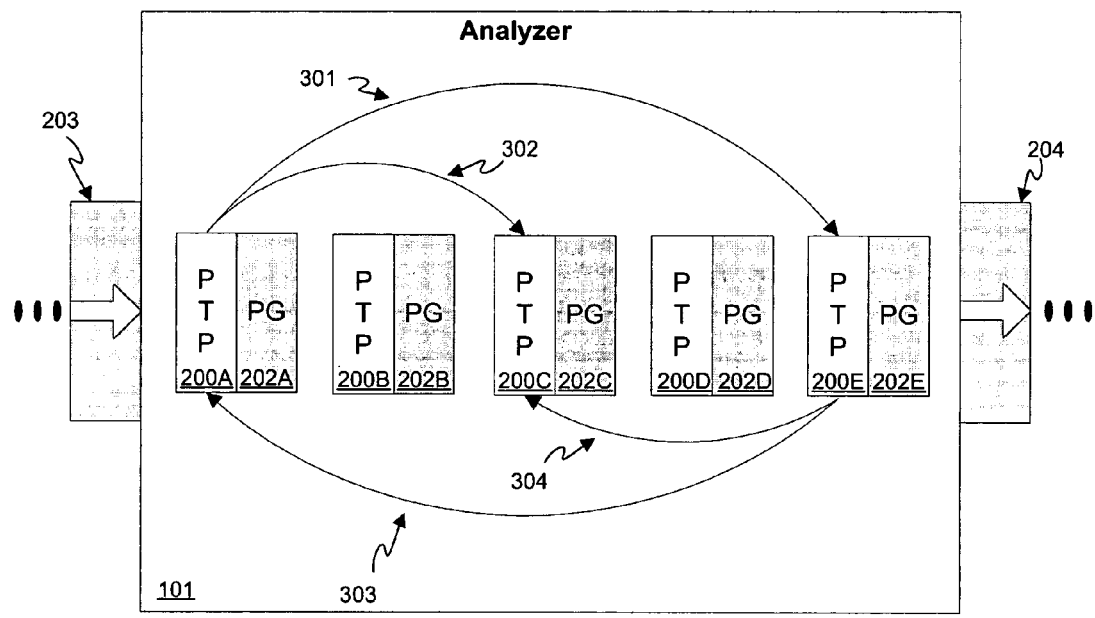
FIG. 3 is a diagram of how forward and backward pointers are collected (or created) during the ingest process according to an embodiment of the present invention.
Figure 4:
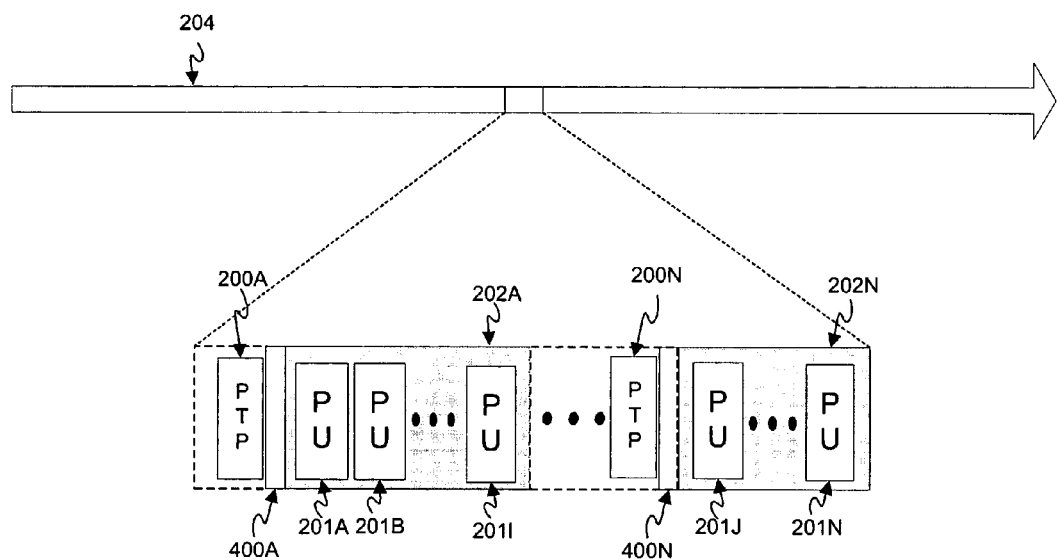
FIG. 4 is a diagram of enhanced data content according to an embodiment of the present invention.

As seen in FIG. 3, the analyzer 101 views multiple presentation groups at once to generate pointers to future and past presentation groups 202, then the pointers are stored in the PTPs 200. Content 203 enters the analyzer 101 in groups based on the maximum speed the content is to be played by the receiving device. If the maximum speed (of fast forward) is normal play times four, as displayed in this drawing, then the analyzer processes multiple presentation groups to generate pointers to the appropriate forward and rewind locations. For the case of an example, assume each presentation group 202 is one speed during play. Five groups would allow the processing of four-speed, taking the original or starting point into account. Analyzer 101 gathers information about PTP 200A, PTP 200C and 200E. PTP 200A stores a pointer 302 for two-speed forward pointing to PTP 200C and a pointer 301 for four-speed forward pointing to 200E. PTP 200E stores a pointer 304 for two-speed rewind pointing to PTP 200C and a pointer 303 for four-speed rewind pointing to PTP 200A. As seen in FIG. 4, enhanced content 204 (including meta data such as pointers 301, 302, 303, 304) contains original content presentation units 201 plus PTPs 200. Each presentation group 202 may contain a video stream and may contain multiple audio streams along with a PTP packet 201 before each access point 400A-400N (400) defined as any entry point in the stream that does not create an illegal stream playback. Industry standards for the type of content may apply and the stream can be processed by any appropriate receiving device. In certain embodiments, it may be desirable to leave the PTPs embedded in the data stream, in this case the PTPs 200 are simply ignored by a receiving device when they are not recognized.

Figure 5:
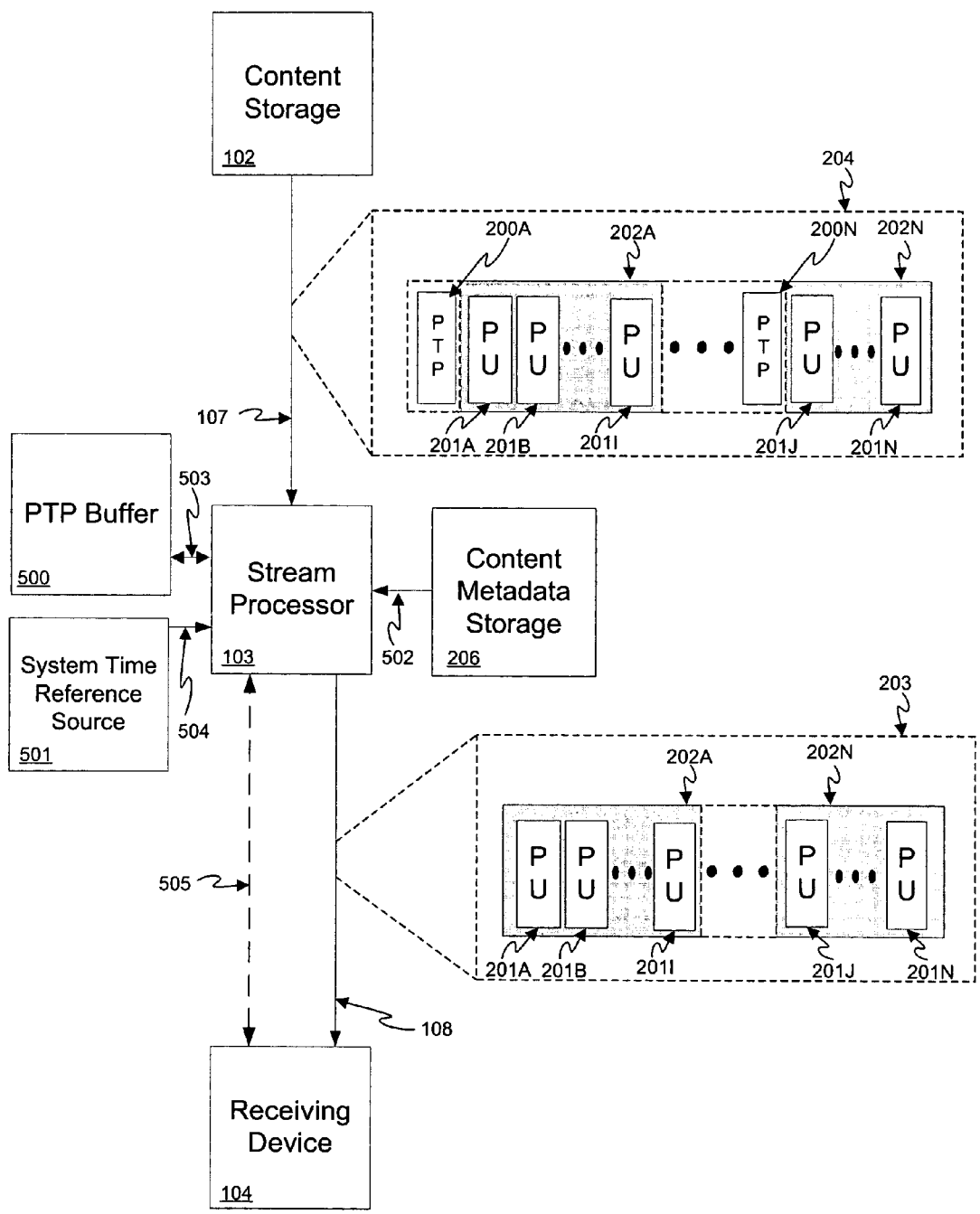
FIG. 5 is a block diagram of the removal of content enhancement and updating of time stamps during output according to an embodiment of the present invention.

As seen in FIG. 5, the output process shows that content metadata 206 associated with content stored in content storage 102 is fed using connection 502 into the stream processor 103 just before the enhanced content 204 is read from content storage 102 using connection 107. Stream processor memory holds the content metadata 206 and uses it to select which content elements are forwarded to the output stream 108. At the same time, the PTP 200 is removed from the enhanced content by the stream processor 103 and is placed in PTP buffer 500 using connection 503 unique to the stream so that its references (such as meta-data) can be accessed during output. This allows the stream processor 103 to efficiently update time stamps embedded in the content, by referring to the system time reference source 501 using connection 504. Stream processor 103 may handle many streams of content at once and maintains memory for the content metadata 206 and PTPs 200 for each stream while processing. The PTP buffer 500 holds the latest PTPs 200, which has been stripped from the enhanced content 204, to allow navigation during play. As content is processed by the stream processor 103, timestamps are updated as necessary in the content 203 by the system time reference source 501 using connection 504, consisting of presentation groups 202 made up of presentation units 201, being outputted to the receiving device 104 using connection 108. This ensures that the output, using connection 108, has the proper timing. Content is outputted to a receiving device 104 using connection 108.

When a request for a navigation change is sent by the receiving device 104 using connection 505, the stream processor 103 reads the command and sends a reply/acceptance to receiving device 104 using connection 505. The command stays active until a new command is received by the stream processor 103 using connection 505. For example, a Fast Forward command remains in effect until a play command is requested by the receiving device 104. This command is read by the stream processor 103 and the output stream is affected using the PTPs with associated pointers. The PTP may contain metadata which can also be used as a clock when generating the output stream in cases where the system time reference source 501 is available.

The stream processor 103, at this point, pulls from the address located in the PTP matching the request, such as 4× Fast Forward frame address, 2× Rewind frame address, or in the case of pause, the same PTP and presentation unit. The packet immediately following a PTP 200 is located at the beginning of a presentation group. If the received command is Pause, the current access point presentation unit is resent, padded by null or filler packets, until a different command is received by the stream processor 103. Consequently, a user receiving the stream will display a static picture on the screen.

The stream processor 103 uses the beginning of the current presentation group as a template to maintain the structure and pacing of the content output. Existing video packets are replaced by special repeat pictures and null packets to maintain timing. Packets corresponding to other component elements are replaced with null packets.

In Rewind and Fast Forward modes, the stream processor uses the PTP navigation pointers to select the next PTP and presentation group access point to display and repeat the process. As discussed, one or more speeds in either direction are possible with information contained in the PTP.

For example, when the receiving device 104 issues a Pause command during normal play, the stream processor 103 continues to transmit data until it encounters the next PTP and checks for a pending command. When stream processor 103 detects the Pause command it plays out the presentation unit from the access point following the PTP followed by a number of null packets, based on information in the PTP. It then inserts repeat pictures and nulls using connection 108 that cause the receiving device 104 to continue to display the picture without exceeding the buffer capacity in the receiving device 104. Stream processor 103 loops back to the current PTP and repeats the process until a new command is received.

Figure 6:
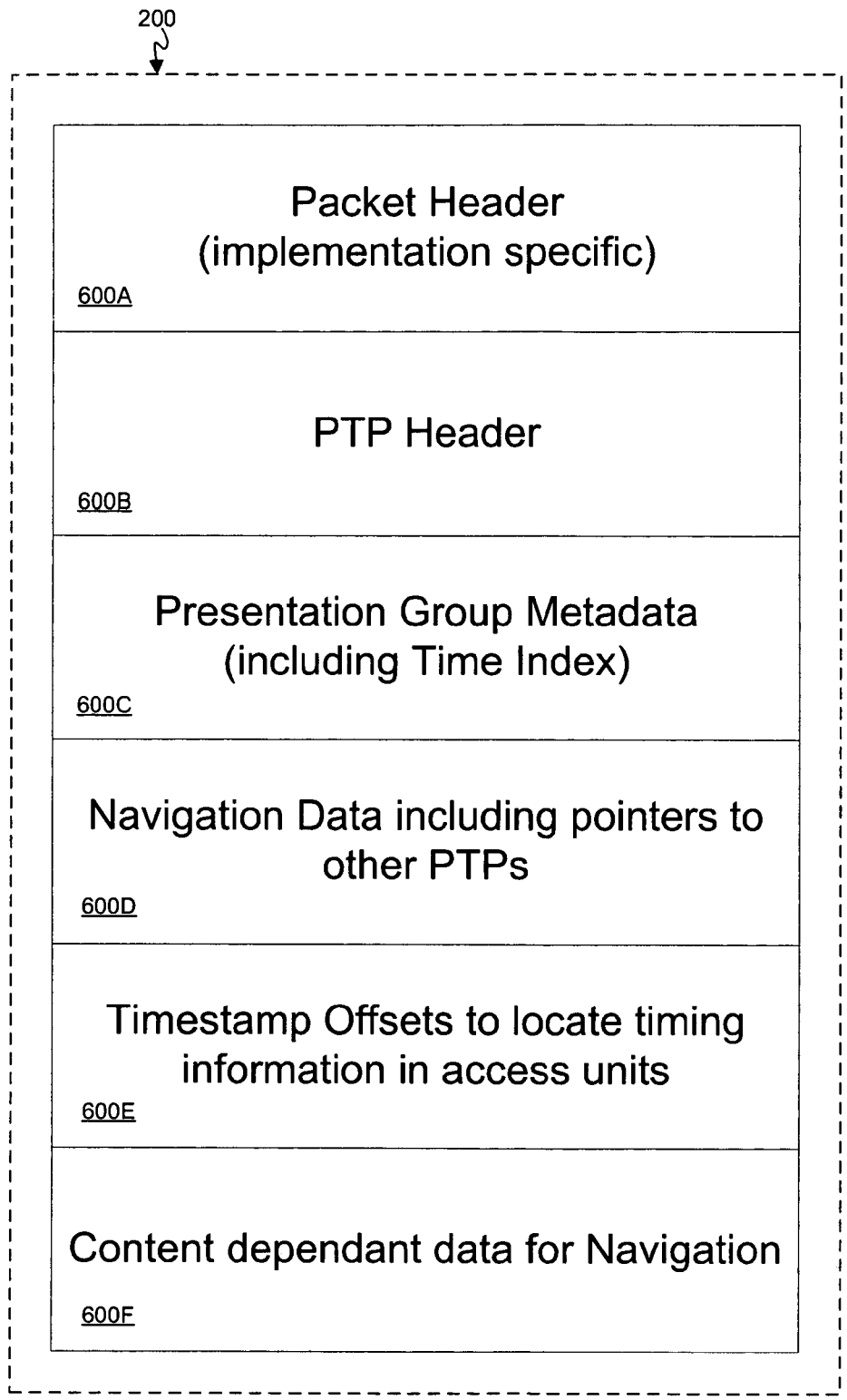
FIG. 6 is a diagram showing metadata information for insertion into a content data stream or file according to an embodiment of the present invention.

As seen in FIG. 6, a PTP packet 200 is divided into multiple sections 600A-600F. The first section 600A contains the packet header information for the stream processor 103 which is defined by the type of stream format being used. This ensures that an enhanced content stream can be processed as a normal content stream by a receiving device 104.

The second section 600B is the PTP header which contains internal flags and version information. This information is used by the stream processor to determine what operations are valid for this presentation group.

The third section 600C is the presentation group metadata which contains flags and indicators for time indices in the stream. These indexes allow the material to maintain real-time indexing so that the stream processor can always locate a time index for the content being streamed, such as 15 minutes beyond the start of the content play.

The fourth section 600D includes navigation data with pointers to next, current, and previous PTPs and objects, and to the distant next and distant previous PTPs. This allows navigation control over Fast Forward, Rewind, pause, and any other non-normal play during any part of the playback, such as copyright, advertisements, previews, etc., during which Fast Forward or any other type of bypass may not be allowed.

The fifth section 600E includes pointers to various time stamps which the stream processor 103 must updates during output of content. This maintains the timing and synchronization of all presentation units for this presentation group.

The sixth section 600F is content information such as filler detail for navigation functionality. Null or filler packets may be placed between presentation units 201 during navigation maintaining the required bit rate so that the buffer in the receiving device doesn't overflow or underflow.

During navigation, the stream processor 103 generates a new packetized stream of video presentation units that provide the visual representation of the navigation requested. Audio is generally muted during non-normal play, but muting is not a requirement. This packetized stream meets the requirements for a normal stream in the supported format and does not depend upon any special support from the receiving device 104. Because the content may be time-based material, the stream processor 103 must ensure that all buffer constraints required by the format are obeyed.

During ingest, each presentation group is analyzed and information required to support the generation of a navigation stream is recorded in the PTP 200. This can include a subset of all speeds from pause to maximum Fast Forward and Rewind. This can be thought of as different speeds of play from zero to a maximum in either direction, with zero being pause, directions being forward and rewind, and the speeds being from a creep just above pause to the maximum speed, determined by a particular application.

One currently used common packetized time based media type is MPEG, specifically MPEG-2 Transport. MPEG-2 Transport is typically used for the transfer of video content for cable and broadcast television, and satellite. Techniques of the invention may be implemented using MPEG-2 Transport as content, but is not limited by this sample implementation, which is described below. MPEG-2 Transport, in this example, consists of AC-3 audio, I-pictures, B-pictures and P-pictures, each of which is approximately equivalent to a presentation unit. MPEG groups these items into Groups of Pictures, or GOPs, the approximate equivalent of presentation groups 202.

The following text describes a sample implementation of the invention previously described in FIGS. 1-6. In this specific instance, the content format is MPEG-2 Transport (ISO/IEC 13818-1) which uses fixed size packets such as PU 201, each being 188 bytes long. Each packet contains a Payload Identifier (PID) that identifies the component element to which the packet belongs. The private transport packets 200 in this example are formatted to fit within one MPEG Transport stream packet.

The component elements are MPEG-2 video (ISO/IEC 13818-2) and Dolby AC3 audio (ATSC A/52), with the video stream being primary, to the extent that it holds the System Reference Clock in the form of a Program Clock Reference (PCR) carried in certain video stream packets. A presentation unit is a MPEG-2 video picture of any type, (I, B or P) or an AC3 audio synch frame. Access points are intra-coded pictures (I pictures) that begin an MPEG Group of Pictures (GOP). Nan MPEG GOP contains 16 or fewer pictures it corresponds directly to a presentation group 202. If the GOP size exceeds 16 pictures, the GOP is represented by multiple presentation groups 202. The second and subsequent presentation groups 202 comprising the GOP do not contain access points 400 and are flagged accordingly in the PTP. This means that pointers (such as 301, 302, . . . ) for navigation will not use PTPs 200 without GOP starts.

Figure 7:
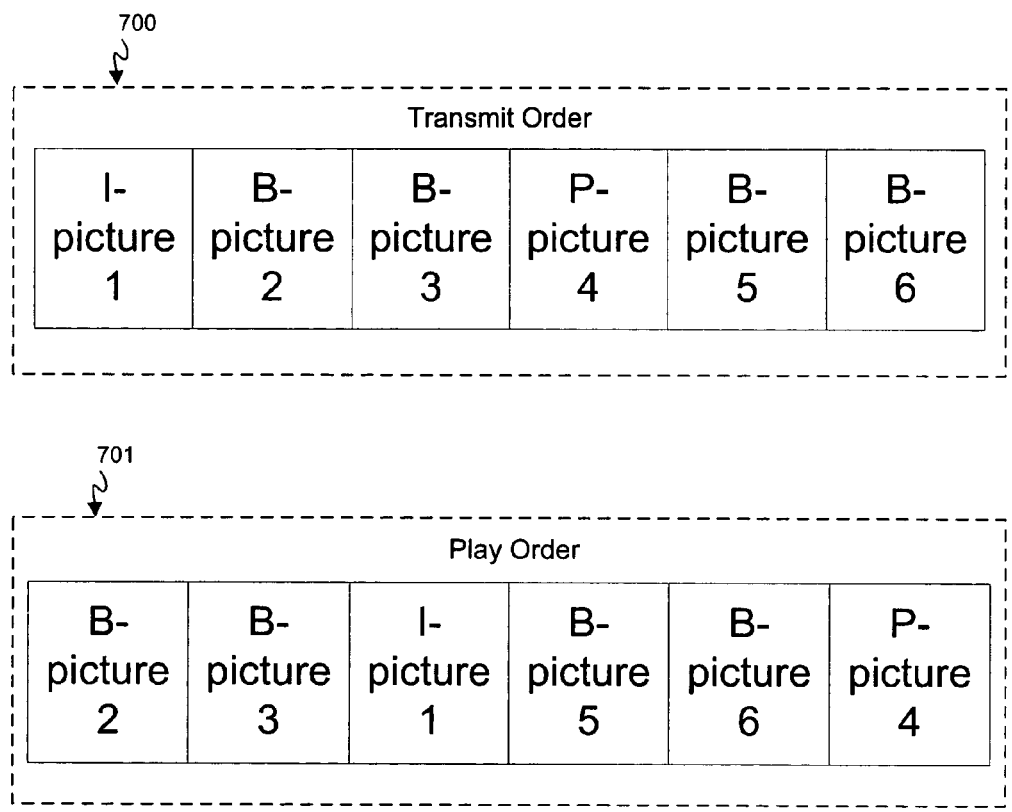
FIG. 7 is a diagram of typical MPEG GOPs during transmission and presentation according to an embodiment of the present invention.
Figure 8:
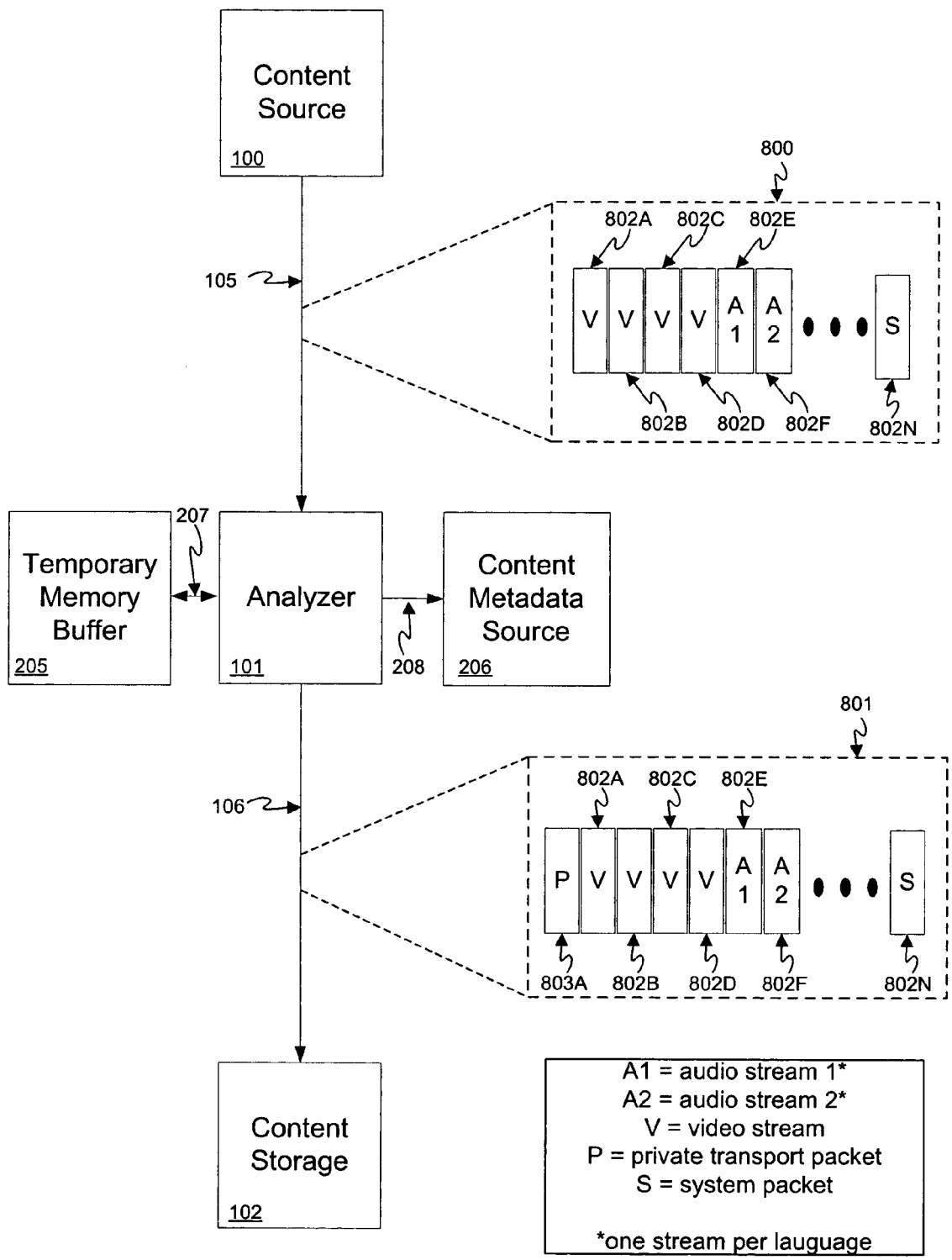
FIG. 8 is a block diagram of the ingest process for an MPEG example according to an embodiment of the present invention.

As seen in FIG. 7, since MPEG video compression depends upon bi-directional prediction (B pictures), transmit order 700 may differ from play order 701 so that B pictures may reference other pictures that precede or follow. If this GOP is open, B-pictures two and three may reference pictures in the preceding GOP. A closed GOP does not allow this. This sequencing is maintained during the timestamp update phase of stream processing. When access points are followed by bi-directionally coded pictures, special processing is employed during trick play modes to replace the initial B pictures with specially coded P pictures that cause the receiving device to re-display the previous picture. This "P-Repeat" picture is made available to the stream processor 103 when the stream is first established. The metadata necessary to control this processing is contained within the content dependant portion of the PTP 200. The pictures are then displayed in play order 701 during output. This is inherent in processing MPEG and the invention does not interfere with or cause this. Future drawings display I-pictures, B-pictures, and P-pictures as a generic V (video) as the differences are not relevant beyond the information previously discussed. As seen in FIG. 8, this process is designed to analyze the content 800 and generate and interleave the PTPs 803A-803N (803) with video, audio and system packets 802A-802N (802) to convert content 800 to enhanced content 801 as the stream is read from the content source 100 using connection 105. This present process is generally similar to the process described earlier, but simply applied to MPEG data. No subsequent processing is required to make the stream ready for play. However, the PTP 803 is normally removed prior to output, a process which is explained later in connection with FIG. 12.

The ingest process involves the content source 100 providing original MPEG content 800 using connection 105 to analyzer 101 which creates the enhanced MPEG content 801. Analyzer 101 examines content 800 elements to build the PTPs 803, which are placed before appropriate MPEG GOPs, which is roughly the equivalent of a presentation group described earlier. PTPs 803 are used only internally and are normally removed before content 801 is outputted. Depending on the application, the PTP metadata could be left in the output data stream for navigation ability in a device that sits downstream from the stream output processor. An example would be a receiving device that implements its own content navigation. Such a device would not need to do its own content analysis to determine valid content navigation points, but could merely store the embedded PTP and use it for navigation instead. Using connection 207, temporary memory buffer 205 is used to store other packets from the nearby GOPs while each PTP 803 is being created. The content metadata 206, containing information about the content 800 such as bit rate, is stored in a buffer using connection 208 while the stream is being created allowing access to future and past PTPs 803. The temporary memory buffer 205 is used so that past and future addresses can be written into the PTP before an entire presentation group and its associated PTP 803 are written to content storage 102. The enhanced MPEG content 801 is then ready to be streamed.

Figure 9:
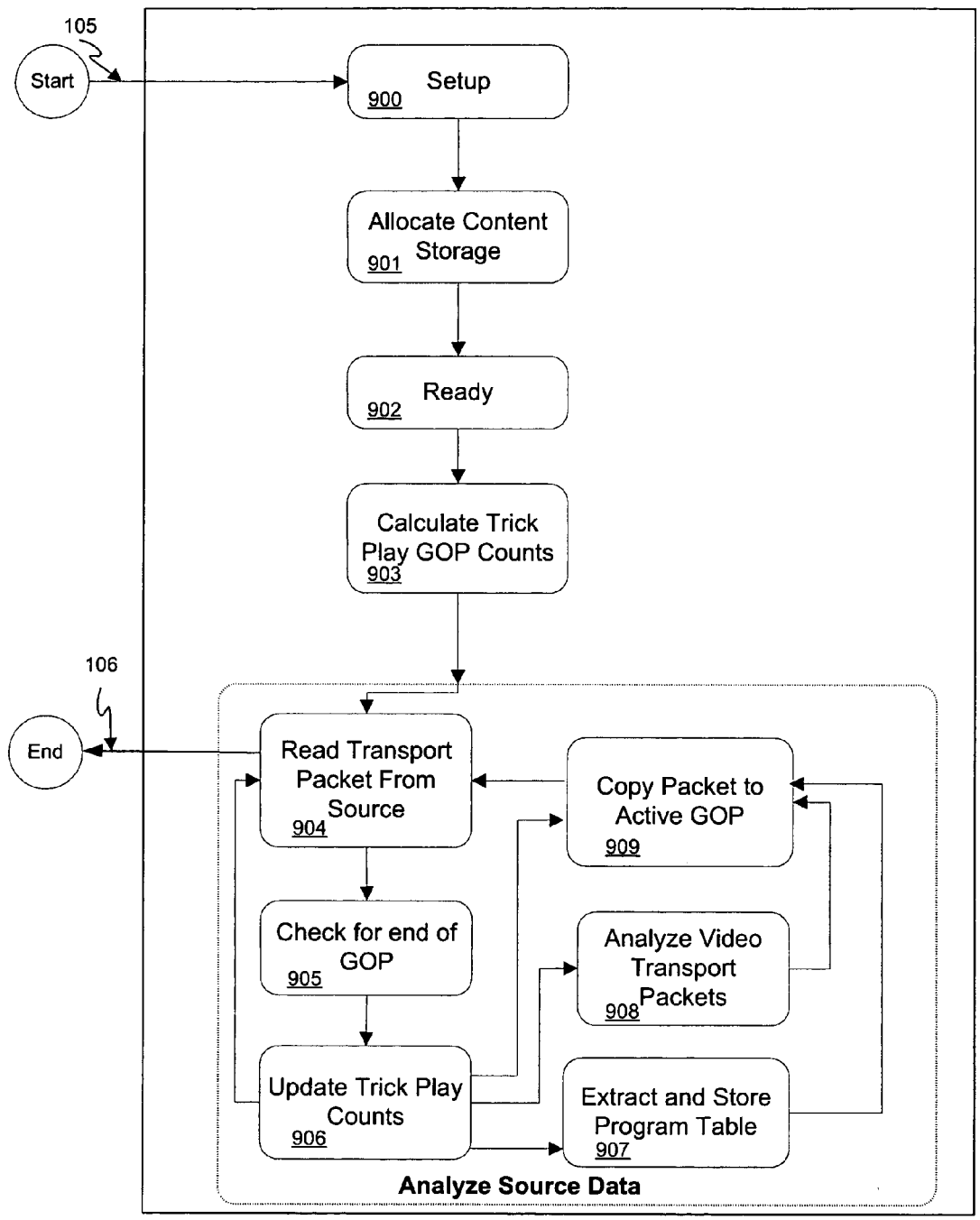
FIG. 9 is a flowchart diagram of MPEG content analysis during ingest according to an embodiment of the present invention.

FIG. 9 shows the overall content flow of the MPEG-2 Transport content through the analyzer 101. A packet is read from the content source 100, inspected for valid transport headers and discarded if the check fails. If the headers indicate that this packet contains a Program Clock Reference, it is used to recalculate the bit rate of the stream. The analysis process begins a process where it reads from the content source 100 using connection 105, determines the presentation group metadata, and then analyses each packet that is contained within the presentation group. It then writes the gathered metadata into a private transport packet, preceding the access point and sends the content to content storage 102 using connection 106. This process repeats until the end of the content is reached or the analyzer is commanded to stop.

While in the loop the analyzer 101 performs the initial setup 900 which includes setting up trick mode rates such as 2× normal play, 4×normal play, etc., after which space in content storage 102 is allocated 901 and the analyzer is ready 902 to process content. GOP counts for trick play, defined as alternate speeds and directions of play, are then calculated 903. The stream is analyzed and the proper number of filler, or repeat packets are calculated depending on the alternate speeds of play and the size of the packets. The process itself enters a loop of processing content until the end of the cycle. The process can be commanded to use specified speeds for trick mode play rates. Based on the number of pictures per GOP, counts of filler or p-repeat packets to be placed in between pictures to maintain a smooth image transition while playing at other than normal speed are calculated, to be stored in the PTP. Default GOP locations are set up for alternate speeds.

During this loop, the analyzer reads transport packet from the source in step 904. It checks to see if the item is the end of a GOP, then updates trick play counts in step 906. If it is a new GOP, a new PTP 200 (or 803) is started. A count is maintained of the different packet types so the stream processor 103 can replace non-video packets with nulls during trick play, maintaining the bit rate and pacing of the original stream.

In step 906, process flow continues in one of four ways depending on the type of payload. If no other processing is required, process flow returns to read another transport packet from source in step 904. If the item being processed is a system packet, it will proceed to extract and store program table in step 907. If the item being processed is a video packet, it will proceed to analyze video transport packets in step 908, which is explained in more detail in FIG. 10. After taking either of these last two options or if it is any other type of packet, including audio, it will proceed to copy packet to active GOP in step 909. When this process is complete, it returns again to read another transport packet from source in step 904. At the end of content being processed, the loop ends and exits using connection 106 to content storage 102. This would indicate end of stream.

Figure 10:
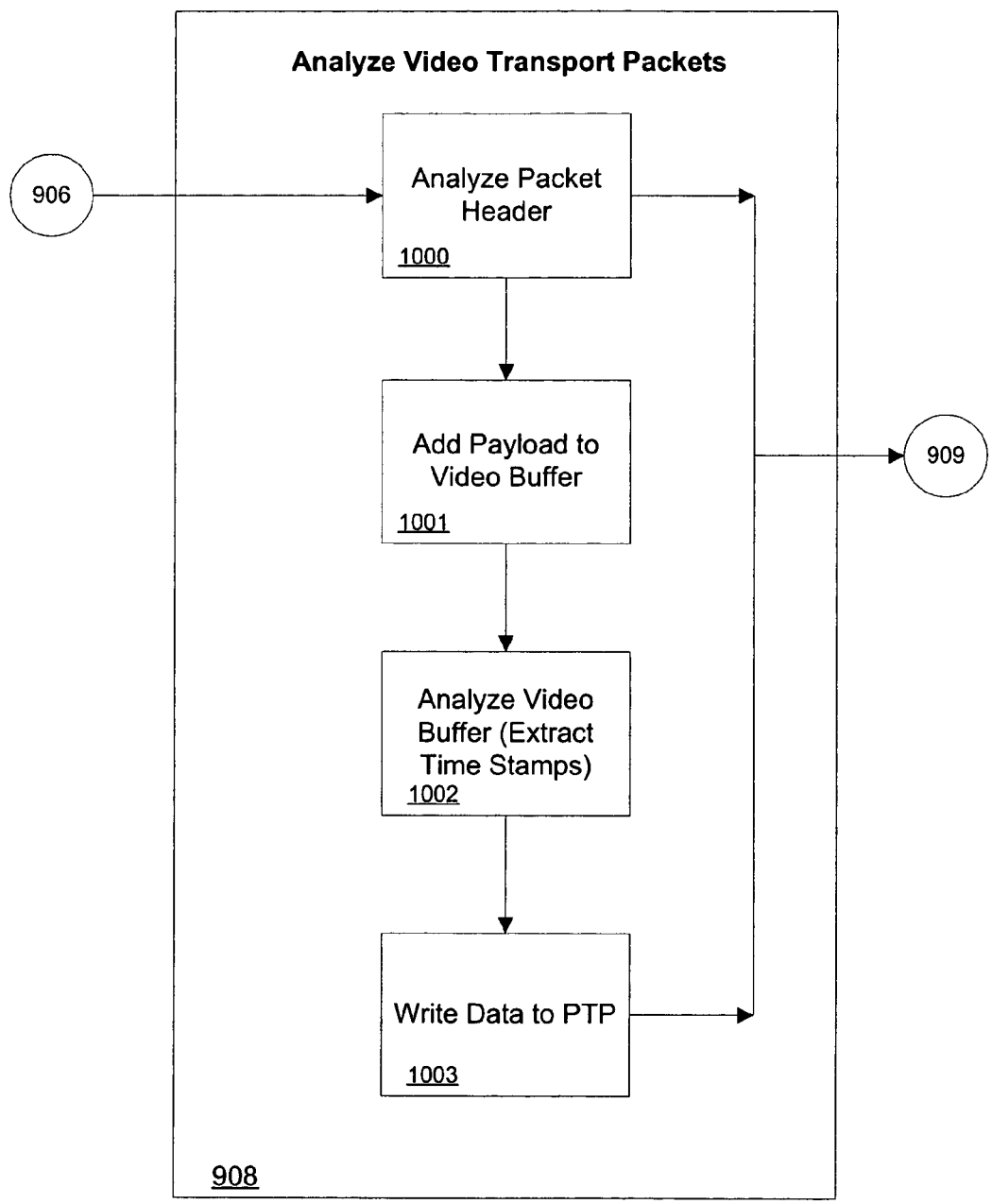
FIG. 10 is a diagram of detailed MPEG video analysis during ingest according to an embodiment of the present invention.

As seen in FIG. 10, the details of analyzing video transport packets in step 908 starts with input from update trick play counts in step 906 and end with output to copy packet to active GOP in step 909. First, the process analyzes the packet header 1000. If the packets contain MPEG-2 system information (the Program Allocation Table and Program Map Table, as described in ISO/IEC 13818-1) their contents are stored for future reference before forwarding the packet. If the packet contains video data it is subject to further analysis. Second, the contents of the video payload are assembled into a presentation unit (an MPEG picture) so that the various MPEG-2 system and picture headers may be examined, as seen in add payload to video buffer in step 1001. Once this is complete, the process analyzes video buffer 1002, where the picture headers are examined to determine the picture type and the locations of various timestamps. This information is written into the current private transport packet 1003.

Figure 11:
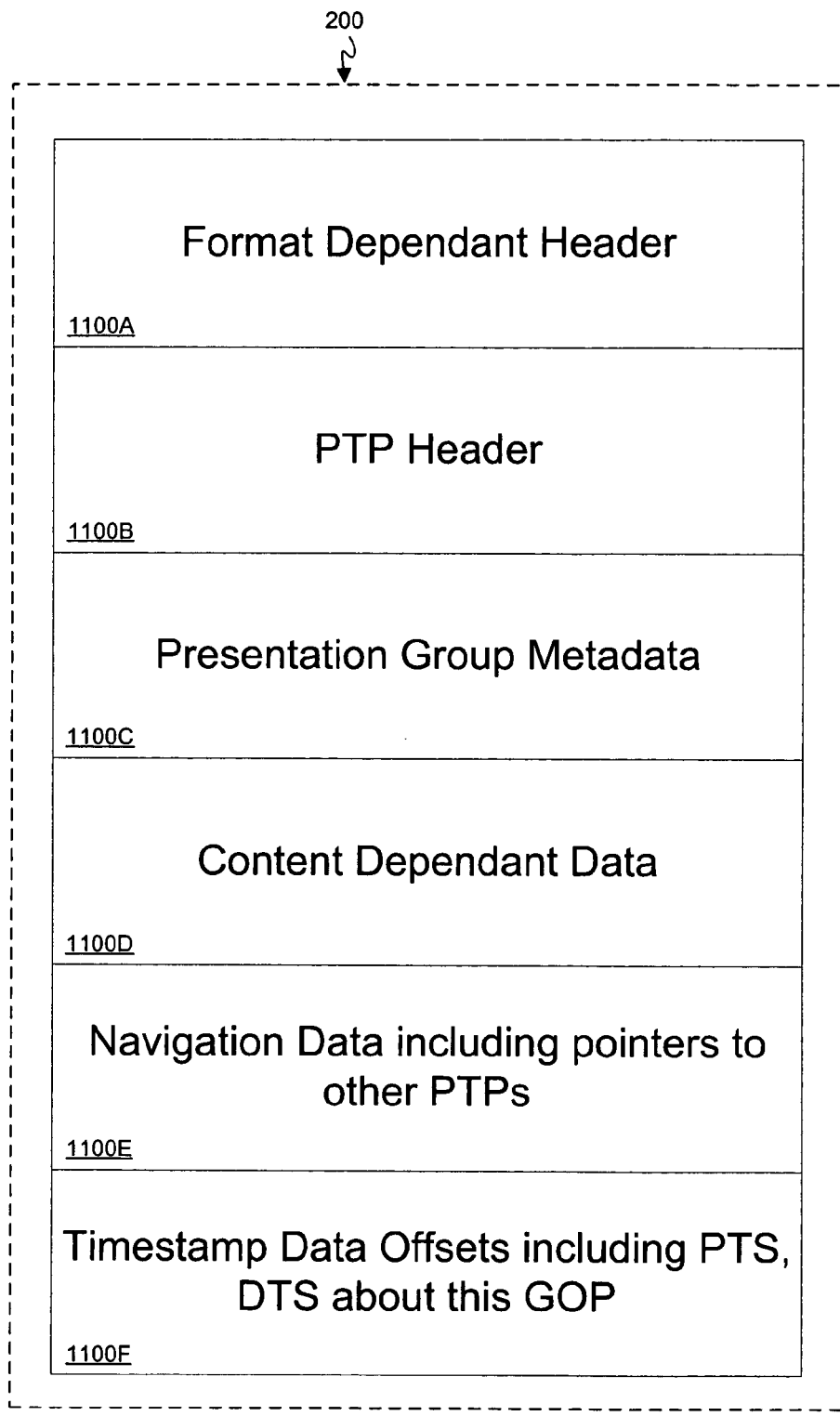
FIG. 11 is a flowchart diagram of MPEG specific PTP (Private Transport Packet) contents according to an embodiment of the present invention.

As seen in FIG. 11, a possible MPEG specific PTP 803 is made up of multiple section 1100A-1100F. Format dependant header 1100A contains header information for the specific format. PTP header 1100B contains PTP specific information. Presentation group metadata 1300C contains time index information. Content dependant data 1100*d* contains counts of P-repeat picture filler to be used in content navigation or trick-mode. Navigation data 1100E contains pointers to future and previous PTP's forward and backward in time. Timestamp data offsets 1100F contains time stamp offsets for PTS and DTS regarding this GOP.

Detail about the content of each section of the MPEG-s Transport stream PTPs is illustrated in the table below.

| Name | Length (bits) | Description |
|---|---|---|
| Format Dependant Header | | |
| sync_byte | 8 | Required field in all transport stream packets; ='0100 0111' = 0x47 |
| reserved | 1 | |
| payload_u-nit_start_flag | 1 | =1 to mark the start of a private data packet. |
| reserved | 1 | |
| PID | 13 | Used to flag this as a proprietary transport packet. |
| reserved | 1 | |
| PTP Header | | |
| save_data_flag | 1 | This bit is used to signal the stream processor that the elapsed_time and current_address fields stored in this private transport packet (PTP), should be presented to control software to assist failure recovery and time dependent operations. |
| Version | 6 | Version number of the PTP packet. |
| Presentation Group Metadata | | |
| elapsed_time | 32 | Number of milliseconds since the start of this file. |
| first_GOP | 1 | =1 to mark the first private data packet in a content file<br>=0 otherwise |
| last_GOP | 1 | =1 to mark the last private data packet in a content file<br>=0 otherwise |
| skip_GOP | 1 | =1 if this GOP is not eligible for trick mode requests<br>=0 process normally |
| Content Dependant Data | | |
| Ipic_tmpBitOffset | 8 | This field is non zero when the temporal reference of the I-picture is NOT byte aligned. |
| reserved | 4 | |
| GOP_flag | 1 | =1 Closed GOP<br>=0 Open GOP |
| Ipic_tmpByteOffset | 8 | Byte offset from the beginning of the transport packet to the location of the first byte of the 10 bit temporal reference of the I-picture. |
| GOP_picture_cnt | 8 | The total number of pictures which are associated with the following GOP. |
| prevGop_picture_cnt | 8 | The number of pictures in the previous GOP - used for Fast Forward and Rewind commands |
| P_repeat0_null_cnt | 8 | Number of null transport packets to send after the first P repeat picture |
| P_repeat1_null_cnt | 8 | Number of null transport packets to send after the second P repeat picture |
| P_repeat2_null_cnt | 8 | Number of null transport packets to send after the third P repeat picture |
| next_address_null_cnt | 8 | Number of null transport packets to send after the P repeat inserted before the next_address I picture |
| previous_address_null_cnt | 8 | Number of null transport packets to send after the P repeat inserted before the previous_address I picture |
| low_ff_address_null_cnt | 8 | Number of null transport packets to send after the P repeat inserted before the low_ff_address I picture |
| med_ff_address_null_cnt | 8 | Number of null transport packets to send after the P repeat inserted before the med_ff_address I picture |

-continued

| Name | Length (bits) | Description |
|---|---|---|
| high_ff_address_null_cnt | 8 | Number of null transport packets to send after the P repeat inserted before the high_ff_address I picture |
| low_rw_address_null_cnt | 8 | Number of null transport packets to send after the P repeat inserted before the low_rw_address I picture |
| med_rw_address_null_cnt | 8 | Number of null transport packets to send after the P repeat inserted before the med_rw_address I picture |
| high_rw_address_null_cnt | 8 | Number of null transport packets to send after the P repeat inserted before the high_rw_address I picture |
| current_obj_address_null_cnt | 8 | Number of null transport packets to send after the P repeat inserted before the current_obj_address I picture |
| next_obj_address_null_cnt | 8 | Number of null transport packets to send after the P repeat inserted before the next_obj_address I picture |
| prev_obj_address_null_cnt | 8 | Number of null transport packets to send after the P repeat inserted before the prev_obj_address I picture |
| prepeat_type | 8 | This signals which type of P repeat picture to use. This may change for each GOP. |
| Navigation Data | | |
| current_address | 64 | Address of this private transport packet. This 64 bit address is the number of bytes from the start of the content file. |
| next_picture_address | 32 | The start of the second picture in this GOP, relative to current_address, in bytes. |
| next_address | 32 | Next PTP relative to current_address in bytes. |
| previous_address | 32 | Previous PTP relative to current_ address in bytes. |
| low_ff_address | 32 | PTP to display for a low speed ff in bytes, relative to current_address |
| med_ff_address | 32 | PTP to display for a medium speed ff in bytes, relative to current_address |
| high_ff_address | 32 | PTP to display for a high speed ff in bytes, relative to current_address |
| low_rw_address | 32 | PTP to display for a low speed rewind in bytes, relative to current_address |
| med_rw_address | 32 | PTP to display for a medium speed rewind in bytes, relative to current_address |
| high_rw_address | 32 | PTP to display for a high speed rewind in bytes, relative to current_address |
| current_obj_address | 32 | If this content file contains chapter, scene, or audio track markers, the address of the PTP associated with the start of the current object, relative to current_address in bytes |
| next_obj_address | 32 | If this content file contains chapter, scene, or audio track markers, the address of the PTP associated with the start of the next object, relative to current_address in bytes |
| prev_obj_address | 32 | If this content file contains chapter, scene, or audio track markers, the address of the PTP associated with the start of the previous object, relative to current_address in bytes |
| Timestamp Data | | |
| for(i=0; i<N; i++) { | | Where N = pictures per GOP Each offset is the byte index from the start of the transport packet of a timestamp associated with a picture. If any offset value equals 0, this means that the associated time stamp does not appear and no action is required. |
| reserved | 8 | |
| PCR_offset | 8 | |
| PTS_offset | 8 | |
| DTS_offset | 8 | |
| } | | |
| per_adder | 64 | Used by software simulation to generate a PCR clock |

Figure 12:
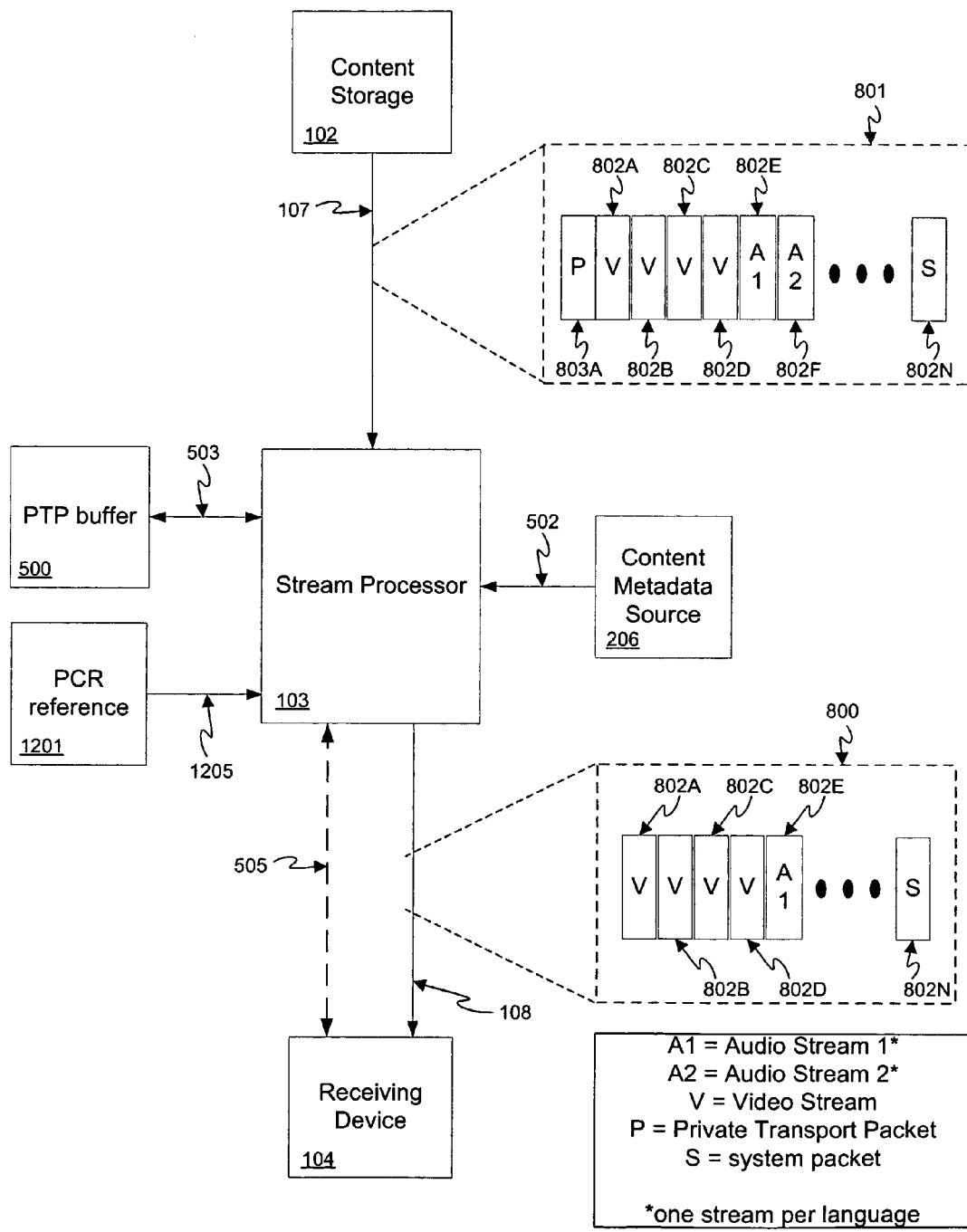
FIG. 12 is a flowchart diagram of the output process for MPEG content according to an embodiment of the present invention.

As in FIG. 12, the output process of streaming data receiver device 104 shows that content metadata 206 for the enhanced content is fed using connection 502 into the stream processor 103 just before the enhanced content 801 is read from content storage 102 using connection 107. Stream processor memory holds the content metadata 206 and uses it to select which content elements are forwarded to the output stream 800. At the same time, the PTP 803A-803N (803) is removed from the enhanced content 801 by the stream processor 103 and is placed in PTP buffer 500 using connection 503 unique to the stream so that its references (or information) can be accessed during output. This allows the stream processor 103 to efficiently update time stamps embedded in the content, by referring to the PCR (program clock reference) 1201 using connection 1205. The stream processor 103 may handle many streams of content at once and maintains memory for the content metadata 206 and PTPs 803 for each stream while processing. The PTP buffer 500 holds the PTPs 803 information, which are stripped from the enhanced content 801, to allow navigation during play. As content is processed by the stream processor 103, timestamps are updated in the content 800 by the PCR reference 1201 using connection 1205, consisting of GOPs made up of presentation units 802A-802N (802), being outputted to the receiving device 104 using connection 108. This ensures that the output stream of data, using connection 108, has the proper timing. Content is outputted to receiving device 104 using connection 108.

During trick modes, the stream processor 103 generates a new MPEG-2 video stream that provides the visual representation of the trick mode. This video stream meets the requirements for a normal MPEG video stream and does not depend upon the receiving device 104 supporting any optional or proprietary extensions to MPEG-2. Since MPEG does not provide a return communication path from the receiving device 104 to the content server, the stream processor must ensure that all buffering constraints imposed by the MPEG-2 specifications are met.

For example, when the receiving device 104 issues a Pause command using connection 505, the stream processor 103 acknowledges the command and plays until it encounters the next PTP 803 and checks for a pending command. When it detects the Pause command it plays out the I Picture immediately following the PTP 803. It then inserts precoded P-repeat pictures that cause the receiving device 104 to continue to display the picture without exceeding buffer capacity in the receiving device 104. These P-repeat pictures are coded to be as small as possible to ensure that the decoder buffer does not overflow. It then loops back to the current PTP and repeats the process until a new command is received. The stream processor 103 uses the beginning of the current Group of Pictures as a template to maintain the structure and pacing of the Transport stream. Existing video packets are replaced by the special repeat pictures and null packets to maintain timing. Packets corresponding to other PIDs are replaced with null packets.

In Rewind and Fast Forward modes, the stream processor uses the PTP navigation pointers to select the next PTP and access point to display and repeats the process.

The Jump and Repeat sequence can be used to implement a number of high level commands including, Pause, Fast Forward, Rewind, and Seek. This sequence is used to display a single I picture, followed by a number of P repeat pictures, to generate the appearance of a still image. It is necessary to determine the correct number of P-repeats and NULL packets in order to maintain the target bit rate and target picture rate. For responsiveness, it is best to send the minimum number of P-repeats. However, a variable number of P repeats could cause a Fast Forward or Rewind sequence to appear jittery.

During ingest, the Analyzer 101 is told the number of P repeats to use. This is encoded in the PTP 803 (or 200) allowing different counts to be used for different types of content. For example, the vast majority of standard television content will be satisfied by sending 4 P repeats, each followed by a specified number of NULL packets. Only extremely large I pictures require more. Flags in the PTP 803 enable these very large I pictures to be bypassed during trick play commands. Additionally, it is required to insert a series of lead in P-repeats followed by null packets before the I-picture. This is determined during the ingest process and stored in the PTP for the presentation group or GOP.

Repeats for different types of GOPs (Groups Of Pictures) such as open or closed GOP's, are calculated independently and a method is needed for each. The repeats for open and closed GOPs are calculated using the methods shown below. Assumptions for Open GOP, Closed GOP, and JumpandPlay Open GOP Examples It is useful to elaborate on the format used to display transport packet sequences so that the following examples may be better understood. Transport packet sequences can be thought of as groups of packets sent in rapid order, one packet following the next. However, when analyzing a transport sequence, it is inconvenient to merely list all of the packets in a single row, therefore, the transport packet sequences are listed in rows of 24 packets numbered 0-23. In the following transport packet sequence diagram, the heading row containing numbers 0-23 are merely shown for clarity so the packet offset can be located easily. In this example, the row representing the packet number has been bolded and italicized for clarification.

In the following examples, several assumptions have been made about the manner in which different types of stream data is sent. As described earlier, streamed data is sent over the network in smaller chunks, or packets. The number of packets needed to send a given piece of information depends upon both the size of the information and the format in which it must be sent. In reality, the different types of packets would vary in size, depending on the format and content of the media being streamed. In these examples, it is assumed that:

I pictures take 8 transport packets to send and are labeled with an "I" followed by a number from 0 to 7.
B pictures take 3 transport packets to send and are label by a "B" followed by a number from 0 to 2.
P pictures take 4 transport packets to send, and are labeled by a "P" followed by a number 0 to 3.
Audio frames take 2 transport packets to send, and are labeled with an "A" followed by 0 or 1.
PATs require a single transport packet, labeled "PT".
PMTs require a single transport packet, labeled "PM"
Null packets are sent in order to fill out the packet stream, labeled as NN
P-repeat pictures are sent in two transport packets, labeled with an "R" followed by 0 or 1.
Nulled Video packets are labeled as "NV"
Nulled audio packets are labeled as "NA"

The following example illustrates the repeat process for an open GOP

The JumpAndRepeat command variables are set as follows:
  LeadInPrepeatCnt=3
  LeadInPrepeatTmpRef=15
  LeadInNullCnt=2
From the target, the PTP null counts will be
  P_repeat0_null_cnt=2
  P_repeat1_null_cnt=2
  P_repeat2_null_cnt=3
From metadata, picture_time=300 (set during stream initialization)
From metadata lastPTS=1000 (maintained by PPF)

An open GOP could then have the following transport packet sequence:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I0 | I1 | I2 | A0 | I3 | I4 | I5 | A1 | PT | PM | I6 | I7 | B0 | B1 | NN | B2 | A0 | B0 | NN | B1 | A1 | B2 | P0 | P1 |
| A0 | A1 | P2 | P3 | B0 | B1 | NN | B2 | A0 | A1 | B0 | NN | B1 | B2 | A0 | A1 | P0 | P1 | A0 | P2 | P3 | A1 | B0 | NN |
| B1 | B2 | A0 | B0 | B1 | NN | A1 | B2 | P0 | P1 | P2 | PT | PM | A0 | B0 | B1 | A1 | B3 | A0 | B1 | B2 | A1 | NN | B3 |

A repeat sequence is useful to implement a 'pause' function to freeze the video on the screen. The repeat command is sent once the desired place for a repeat has been determined. Then, the stream processor reads the packets in that sequence, and inserts repeat packets, null packets, and PM and PT packets in order to display the correct GOP. To the viewer, it appears that the image has paused to a viewer, but in reality, a repeated sequence of I pictures, repeat packets, null packets, PT packets, and PM packets are being streamed. The first row represents the packets as they are read, and the second shows the packets that would be sent for the repeat sequence to implement a pause. Timestamp references, DTS and PTS information are included for columns where Repeat packets have been inserted, and where the repeat sequence is repeated. The rewind command brings the read data location pointer back to the start of the repeated I frame, indicated as packet I0.

The repeat sequence would be:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I0 | I1 | I2 | A0 | I3 | I4 | I5 | A1 | PT | PM | I6 | I7 | B0 | B1 | NN | B2 | A0 | B0 | I0 | I1 | I2 | A0 | I3 | I4 |
| R0 | R1 | NV | NA | NV | R0 | R1 | NA | PT | PM | NV | NV | R0 | R1 | NN | NV | NA | NV | I0 | I1 | I2 | NA | I3 | I4 |
| ˆPrepeat | | | | | ˆPrepeat | | | | | | | ˆPrepeat | | | | | | ˆrewind to I picture | | | | | |
| ˆTmpRef = 15 | | | | | ˆTmpRef = 16 | | | | | | | ˆTmpRef = 17 | | | | | | ˆTmpRef = 0 | | | | | |
| ˆDTS = 1000 | | | | | ˆDTS = 1300 | | | | | | | ˆDTS = 1600 | | | | | | ˆDTS = 1900 | | | | | |
| ˆPTS = 1300 | | | | | ˆPTS = 1600 | | | | | | | ˆPTS = 1900 | | | | | | ˆPTS = 2200 | | | | | |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I5 | A1 | PT | PM | I6 | I7 | B0 | B1 | NN | B2 | A0 | B0 | NN | B1 | A1 | B2 | P0 | P1 | A0 | A1 | P2 | P3 | B0 | B1 |
| I5 | NA | PT | PM | I6 | I7 | R0 | R1 | NN | NV | NA | NV | NN | R0 | NA | R1 | NV | NV | NA | NA | R0 | R1 | NV | NV |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| | | | | | | ^Prepeat TmpRef = 1 DTS = 2200 PTS = 2500 | | | | | | | ^Prepeat TmpRef = 2 DTS = 2500 PTS = 2800 | | | | | | ^Prepeat TmpRef = 3 DTS = 2800 PTS = 3100 | | | | | |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| NN | B2 | I0 | I1 | I2 | A0 | I3 | I4 | I5 | A1 | PT | PM | I6 | I7 | B0 | B1 | NN | B2 | A0 | B0 | NN | B1 | A1 | B2 |
| NN | NV | I0 | I1 | I2 | NA | I3 | I4 | I5 | NA | PT | PM | I6 | I7 | R0 | R1 | NN | NV | NA | NV | NN | R0 | NA | R1 |
| | | ^rewind to I Picture TmpRef = 0 DTS = 3100 PTS = 3400 | | | | | | | | | | | ^Prepeat TmpRef = 1 DTS = 3400 PTS = 3700 | | | | | | ^Prepeat TmpRef = 2 DTS = 3700 PTS = 4000 | | | | |

The following example illustrates the repeat process for a closed GOP
The JumpAndRepeat command variables are set as follows:
  LeadInPrepeatCnt=3
  LeadInPrepatTmpRef=15
  LeadInNullCnt=2
From the target, PTP the null counts will be
  P_repeat0_null_cnt=2
  P_repeat1_null_cnt=2
  P_repeat2_null_cnt=3
From metadata, picture_time=300 (set during stream initialization)
From metadata lastPTS=1000 (maintained by PPF)
A closed GOP could have the following transport packet sequence:

The following example illustrates the JumpAndPlay process:
The JumpAndPlay command is used to resume steady state processing after any trick mode command (Rewind, Fast Forward, Seek, etc). This command is also used to jump from one content file to another. It is very similar to the Jump and Repeat—with the repeat sequence replaced with "resume" sequence.
The JumpAndRepeat command variables are set as follows:
  LeadInPrepeatCnt=3
  LeadInPrepatTmpRef=15
  LeadInNullCnt=2
From metadata, picture_time=300 (set during stream initialization)
From metadata lastPTS=1000 (maintained by PPF)

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I0 | I1 | I2 | A0 | I3 | I4 | I5 | A1 | PT | PM | I6 | I7 | P0 | P1 | NN | P2 | A0 | P3 | NN | B0 | A1 | B1 | P2 | B0 |
| A0 | A1 | B1 | B2 | P0 | P1 | NN | P2 | A0 | A1 | P3 | NN | B0 | B1 | A0 | A1 | B2 | B0 | A0 | B1 | B2 | A1 | P0 | NN |
| P1 | P2 | A0 | P3 | B0 | NN | A1 | B1 | B2 | B0 | B1 | PT | PM | A0 | B2 | P0 | A1 | P1 | A0 | P2 | P3 | A1 | NN | B0 |

The repeat sequence would be:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I0 | I1 | I2 | A0 | I3 | I4 | I5 | A1 | PT | PM | I6 | I7 | P0 | P1 | NN | P2 | A0 | P3 | I0 | I1 | I2 | A0 | I3 | I4 |
| R0 | R1 | NV | NA | NV | R0 | R1 | NA | PT | PM | NV | NV | R0 | R1 | NN | NV | NA | NV | I0 | I1 | I2 | NA | I3 | I4 |
| ^Prepeat TmpRef = 15 DTS = 1000 PTS = 1300 | | | | | | ^Prepeat TmpRef = 16 DTS = 1300 PTS = 1600 | | | | | | ^Prepeat TmpRef = 17 DTS = 1600 PTS = 1900 | | | | | | ^rewind to I picture TmpRef = 0 DTS = 1900 PTS = 2200 | | | | | |

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| 15 | A1 | PT | PM | I6 | I7 | P0 | P1 | NN | P2 | A0 | P3 | NN | B0 | A1 | B1 | P2 | B0 | A0 | A1 | B1 | B2 | P0 | P1 |
| 15 | NA | PT | PM | I6 | I7 | R0 | R1 | NN | NV | NA | NV | NN | R0 | NA | R1 | NV | NV | NA | NA | R0 | R1 | NV | NV |
| | | | | | | ^Prepeat TmpRef = 1 DTS = 2200 PTS = 2500 | | | | | | ^Prepeat TmpRef = 2 DTS = 2500 PTS = 2800 | | | | | | ^Prepeat TmpRef = 3 DTS = 2800 PTS = 3100 | | | | | |

| 0 | 1 | 2 | 3 | 4 | 5 | 6 | 7 | 8 | 9 | 10 | 11 | 12 | 13 |
|---|---|---|---|---|---|---|---|---|---|----|----|----|----|
| NN | P2 | I0 | I1 | I2 | A0 | I3 | I4 | I5 | A1 | PT | PM | I6 | I7 |
| NN | NV | I0 | I1 | I2 | NA | I3 | I4 | I5 | NA | PT | PM | I6 | I7 |
| | | ^rewind to I Picture etc. TmpRef = 0 DTS = 3100 PTS = 3400 | | | | | | | | | | | |

An open GOP could then have the following transport packet sequence:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I0 | I1 | I2 | A0 | I3 | I4 | I5 | A1 | PT | PM | I6 | I7 | B0 | B1 | NN | B2 | A0 | B0 | NN | B1 | A1 | B2 | P0 | P1 |
| A0 | A1 | P2 | P3 | B0 | B1 | NN | B2 | A0 | A1 | B0 | NN | B1 | B2 | A0 | A1 | P0 | P1 | A0 | P2 | P3 | A1 | B0 | NN |
| B1 | B2 | A0 | B0 | B1 | NN | A1 | B2 | P0 | P1 | P2 | PT | PM | A0 | B0 | B1 | A1 | B3 | A0 | B1 | B2 | A1 | NN | B3 |

The JumpAndPlay sequence would be:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| I0 | I1 | I2 | A0 | I3 | I4 | I5 | A1 | PT | PM | I6 | I7 | B0 | B1 | NN | B2 | A0 | B0 | I0 | I1 | I2 | A0 | I3 | I4 |
| R0 | R1 | NV | NA | NV | R0 | R1 | NA | PT | PM | NV | NV | R0 | R1 | NN | NV | NA | NV | I0 | I1 | I2 | NA | I3 | I4 |
| | | | | | | | | | | | | | | | | | | Prepeat rewind to I picture TmpRef = 0 DTS = 1900 PTS = 2200 | | | | | |

(continued)

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| 15 | A1 | PT | PM | 16 | 17 | B0 | B1 | NN | B2 | A0 | B0 | NN | B1 | A1 | B2 | P0 | P1 | A0 | A1 | P2 | P3 | B0 | B1 |
| 15 | NA | PT | PM | 16 | 17 | R0 | R1 | NN | NV | NA | R0 | NN | R1 | NA | NV | P0 | P1 | A0 | A1 | P2 | P3 | B0 | B1 |

With annotations:
- At col 6–7: Prepeat, TmpRef = 1, DTS = 2200, PTS = 2500
- At col 11–12: Prepeat, TmpRef = 2, DTS = 2500, PTS = 2800
- At col 16–17: normal play, TmpRef = SAME, DTS = DTS + ΔPCR, PTS = PTS + ΔPCR
- At col 22–23: normal play, TmpRef = SAME, DTS = DTS + ΔPCR, PTS = PTS + ΔPCR

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| NN | B2 | A0 | A1 | B0 | NN | B1 | B2 | A0 | A1 | P0 | P1 | A0 | P2 | P3 | A1 | B0 | NN | B1 | B2 | A0 | B0 | B1 | NN |
| NN | B2 | A0 | A1 | B0 | NN | B1 | B2 | A0 | A1 | P0 | P1 | A0 | P2 | P3 | A1 | B0 | NN | B1 | B2 | A0 | B0 | B1 | NN |

With annotations:
- At col 3: normal play, TmpRef = SAME, DTS = DTS + ΔPCR, PTS = PTS + ΔPCR
- At col 8: normal play, TmpRef = SAME, DTS = DTS + ΔPCR, PTS = PTS + ΔPCR When the JumpAndPlay command targets the address of a closed GOP, there is no need for any special bit stream manipulation following the I picture—normal play resumes with the first transport packet of the GOP, however, a P-repeat and null packets may be required before the I picture.

The previous examples illustrate the general process for processing and displaying repeat sequences. However, these examples do not represent the full variety of repeat sequences utilized by this invention, they are merely shown to aid in the understanding of the function of the invention. They do not represent the only embodiment of the invention, but merely an example of how it may be utilized.

Embodiments of this invention support a unique and powerful way to increase the efficiency and speed with which trick play commands can be utilized through the unique architecture of the PTP packet. By pre-processing streamed media during ingest, and inserting critical time-stamp references and jump points, the need to search through an entire media stream for a specific reference point is therefore eliminated. It should be noted however, that while the format of the PTP may change, and the algorithms used to derive time-stamp information may be modified, the process remains the same: the use of specialized PTP packets is a novel way to solve the problem of efficiently executing trick play commands in streamed media.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for processing media data, the method comprising:
   receiving a multimedia data stream for a single program, wherein the multimedia data stream is a time based sequence of packets encoded according to a first content format, and wherein the multimedia data stream includes first content containing first content portions;
   analyzing the first content to detect sets of related first content portions, each set defining a presentation group for the first content, and to determine an access point for each presentation group, the access point including timing data in the first content;
   generating a private transport packet for each presentation group, each private transport packet including:
      metadata derived from at least one of the first content portions in the respective presentation group, the metadata including:
         time stamps received for each of the packets in the respective presentation group that correspond to a normal playback of the multimedia data stream, and
         one or more time stamp offsets corresponding to one or more presentation groups in the multimedia data stream, a time stamp offset identifying where the one or more presentation groups reside relative to the respective presentation group;
      a pointer to the access point determined for the respective presentation group, wherein the pointer identifies a position of the respective presentation group throughout the multimedia data stream relative to a position of at least one other presentation group in the first content,
wherein the one or more time stamp offsets and the pointer to the presentation group's access point at least in part represent the presentation group's dependencies on one or more other presentation groups within the multimedia data stream,
wherein a plurality of private transport packets generated for a plurality of presentation groups in the multimedia data stream are navigable for modifying the normal playback of the multimedia data stream based on presentation group dependencies without requiring searching for individual packet timestamps of the multimedia data stream;
creating second content by embedding the private transport packet for each presentation group in the multimedia data stream; and
storing the second content.

2. A method for presenting content to a client device, the method comprising:
receiving a multimedia data stream for a single program, wherein the multimedia data stream is a time based sequence of packets encoded according to a first content format, and wherein the multimedia data stream includes second content that includes first content, and private transport packets, the first content containing first content portions that are arranged as a series of presentation groups, each presentation group including related first content portions and one of the private transport packets, each private transport packet containing metadata derived from at least one of the first content portions in the respective presentation group, the metadata including:
time stamps received for each of the packets in the respective presentation group that correspond to a normal playback of the multimedia data stream,
one or more time stamp offsets corresponding to one or more presentation groups in the multimedia data stream, a time stamp offset identifying where the one or more presentation groups reside relative to the respective presentation group, and
a pointer to the access point determined for the respective presentation group, wherein the pointer identifies a position of the respective presentation group throughout the multimedia data stream relative to a position of at least one other presentation group in the first content, the access point including timing data in the first content,
wherein the one or more time stamp offsets and the pointer to the presentation group's access point at least in part represent the presentation group's dependencies on one or more other presentation groups within the multimedia data stream,
producing a content stream for presentation to the client device using the metadata in at least one of the private transport packets associated with at least one of the presentation groups of the first content portions in the second content, wherein multiple private transport packets generated for a plurality of presentation groups in the multimedia data stream are navigable for fast-forwarding or rewinding playback of the multimedia data stream based on presentation group dependencies; and
presenting the content stream to the client device.

3. A method for processing information, the method comprising:
analyzing portions of a logical data stream including data content received as a multimedia data stream for a single program, wherein the multimedia data stream is a time based sequence of packets encoded according to a first content format, to detect groups of the data content, each group defining a presentation of the logical data stream, and to determine an access point for each group, the access point including timing data in the logical data stream; and
based on the analyzing, generating metadata for each of at least one of the groups of the data content, the metadata including:
time stamps received for each of the packets in the respective group that correspond to a normal playback of the multimedia data stream,
one or more time stamp offsets corresponding to one or more groups in the multimedia data stream, a time stamp offset identifying where the one or more groups reside relative to the respective group, and
a pointer to the access point determined for the respective group, wherein the pointer identifies a position of the respective group throughout the multimedia data stream relative to a position of at least one other group in the first content,
wherein the one or more time stamp offsets and the pointer to the group's access point at least in part represent the group's dependencies on one or more other groups within the multimedia data stream,
wherein the metadata is embedded in the logical data stream being used to support manipulation of presenting the logical data stream when the logical data stream is later presented to a receiver for play back, the metadata navigable for modifying the normal playback of the multimedia data stream based on group dependencies.

4. A method as in claim 3, wherein generating metadata includes:
generating metadata that i.) supports navigation among different portions of the logical data stream in response to commands received from remote users each playing back at least a portion of the logical data stream substantially in real-time; and ii.) enables serial streaming of non-contiguous portions of the logical data stream in response to commands from remote users requesting presentation of the logical data stream in a different manner than originally supported by a content format of the logical data stream.

5. A method as in claim 3 further comprising:
creating at least one retrievable file formatted to include analyzed portions of the logical data stream and corresponding generated metadata;
for storage of the metadata in proximity to a first portion of the logical data stream, generating a pointer identifying a relative location of a second portion of the logical data stream; and
storing the pointer in relation to the first portion of the data stream.

6. A method as in claim 5 further comprising:
interleaving the pointer between portions of the logical data stream at an access point including a data field in a known position relative to the first portion of the logical data stream.

7. A method as in claim 3 further comprising:
buffering contiguous portions of the logical data stream;
generating multiple pointers based on the relative positions of each of multiple portions of the logical data stream; and
inserting the pointers at predetermined data fields interleaved among portions of the logical data stream.

8. A method as in claim 7 further comprising:
utilizing the pointers on playback of the logical data stream to determine which portion of the logical data stream is streamed to a user in response to receiving a command from the user to which the logical data stream is transmitted.

9. A method as in claim 3, wherein the data content is formatted according to MPEG (Moving Picture Experts Group).

10. A method as in claim 5 further comprising:
storing the file along with similarly formatted files in a semiconductor chip-based memory storage system; and
streaming the files and data content therein to receiver devices that play corresponding logical data streams in real-time.

11. A method as in claim 3 further comprising:
reserving data fields in the file for tracking the metadata.

12. A method as in claim 3, wherein generating metadata includes:
generating time stamps for portions of the logical data stream to support replaying the logical data stream later in time.

13. A method as in claim 12 further comprising:
inserting the generated time stamps in relation to corresponding portions of the logical data stream.

14. A method as in claim 3 further comprising:
interleaving the logical data stream and generated metadata to produce an enhanced logical data stream; and
storing the enhanced logical data stream in memory for later retrieval and playback to multiple users.

15. A method as in claim 14 further comprising:
removing the metadata prior to transmitting the logical data stream to the receiver.

16. A method as in claim 14, wherein generating metadata includes:
generating offset information identifying a location of time stamps supporting playback of the enhanced logical data stream.

17. A method as in claim 3 further comprising:
storing the data content of the logical data stream and generated metadata in a semiconductor chip based memory unit for later retrieval.

18. A system to process data content in a logical data stream, the system comprising:
a buffer to at least temporarily store portions of the logical data stream received as a multimedia data stream for a single program, wherein the multimedia data stream is a time based sequence of packets encoded according to a first content format; and
an analyzer to analyze portions of the logical data stream received to detect groups of the logical data stream, each group defining a presentation of the logical data stream, and to determine an access point for each group, the access point including timing data in the logical data stream, the analyzer generating metadata for each of at least one of the groups of the logical data stream, the metadata including:
time stamps received for each of the packets in the respective presentation group that correspond to a normal playback of the multimedia data stream,
one or more time stamp offsets corresponding to one or more presentation groups in the multimedia data stream, a time stamp offset identifying where the one or more presentation groups reside relative to the respective presentation group, and
a pointer to the access point determined for the respective presentation group, wherein the pointer identifies a position of the respective presentation group throughout the multimedia data stream relative to a position of at least one other presentation group in the first content,
wherein the one or more time stamp offsets and the pointer to the presentation group's access point at least in part represent the presentation group's dependencies on one or more other presentation groups within the multimedia data stream,
wherein the metadata is embedded in the logical data stream being used to support manipulation of presenting the logical data stream when the logical data stream is later presented to a receiver for play back, the metadata navigable for modifying the normal playback of the multimedia data stream based on presentation group dependencies.

19. A system as in claim 18, wherein the metadata: i.) supports navigation among different portions of the logical data stream in response to commands received from remote users each playing back at least a portion of the logical data stream substantially in real-time; and ii.) enables serial streaming of non-contiguous portions of the logical data stream in response to commands from remote users requesting presentation of the logical data stream in a different manner than originally supported by a content format of the logical data stream.

20. A system as in claim 18, wherein the analyzer creates a retrievable file formatted to include analyzed portions of the logical data stream and corresponding generated metadata, the metadata including pointers to different portions of the logical data stream.

21. A system as in claim 18, wherein the buffer buffers contiguous portions of the logical data stream; and wherein the analyzer:
generates multiple pointers based on the relative positions of each of multiple portions of the logical data stream; and
inserts the pointers into the logical data stream.

22. A system as in claim 18, wherein the data content is formatted according to an MPEG (Moving Picture Experts Group) protocol.

23. A system as in claim 18, wherein the analyzer generates metadata including time stamps for portions of the logical data stream to support replaying the logical data stream later in time.

24. A system as in claim 18, wherein the analyzer interleaves the logical data stream and generated metadata to produce an enhanced logical data stream for storage in memory.

25. A system as in claim 24, wherein the analyzer generates metadata including offset information identifying a location of time stamps supporting playback of the enhanced logical data stream.

26. A system as in claim 18, wherein the analyzer generates metadata including content-dependent information to support navigation within the logical data stream.

27. A system as in claim 18 further comprising:
a storage device including multiple addressable memory chips to store the logical data stream and generated metadata for later retrieval.

28. A method for presenting data content to a client, the method comprising:
retrieving an enhanced logical data stream a multimedia data stream for a single program, wherein the multimedia data stream is a time based sequence of packets encoded according to a first content format, and wherein the multimedia data stream includes data content, and metadata, the data content arranged as a series of groups, each group including related data content, and the metadata associated with each of at least one of the groups, the metadata including information enabling manipulation of how the data content of the enhanced logical data stream is presented to the client device, wherein the information enabling manipulation includes:
time stamps received for each of the packets in the respective group that correspond to a normal playback of the multimedia data stream,
one or more time stamp offsets corresponding to one or more groups in the multimedia data stream, a time stamp offset identifying where the one or more groups reside relative to the respective presentation group, and
a pointer to an access point for each group, the access point including timing data in the data content wherein the pointer identifies a position of the respective group throughout the multimedia data stream relative to a position of at least one other group in the first content, the access point including timing data in the first content,
wherein the one or more time stamp offsets and the pointer to the group's access point at least in part represent the group's dependencies on one or more other groups within the multimedia data stream,
generating a content stream including the data content depending on input from the client device indicating how to present the data content, wherein multiple private transport packets generated for a plurality of groups in the multimedia data stream are navigable for fast-forwarding or rewinding playback of the multimedia data stream based on group dependencies without requiring searching for individual packet timestamps of the multimedia data stream; and
presenting the content stream to the client.

29. A method as in claim 28, further comprising:
navigating among different portions of the logical data stream in response to commands received from remote users each playing back at least a portion of the logical data stream substantially in real-time, the metadata enabling serial streaming of non-contiguous portions of the logical data stream in response to commands from remote users requesting presentation of the logical data stream in a different manner than originally supported by a content format of the logical data stream.

30. A method as in claim 28 further comprising:
streaming first portions of the enhanced logical data stream for presentation of corresponding data content to the client while simultaneously streaming second, different portions of the logical data stream for presentation of corresponding data content to another client.

31. A method as in claim 30 further comprising:
utilizing time stamp information stored in the metadata to present the content stream to the client with respect to a real-time clock.

32. A method as in claim 28 further comprising:
utilizing offset information stored as metadata to locate time stamps in the enhanced logical data stream for presenting the content stream to the client.

33. A method as in claim 28 further comprising:
removing the metadata from the enhanced logical data stream to produce the content stream including data content presented to the client.

34. A method as in claim 28, wherein pointers are interleaved with the data content of the enhanced logical data stream, the pointers identifying portions of the enhanced logical data stream including other metadata.

35. A method as in claim 34, wherein the pointers support navigation of the enhanced logical data stream and manipulation of how the data content of the enhanced logical data stream is presented to the client.

36. A method as in claim 28, wherein the metadata includes content dependent information to support different types of presentation modes.

37. A method as in claim 28 further comprising:
receiving an input command from the client identifying a presentation mode for receiving the data content at the client; and
utilizing pointers stored in specified data fields of the enhanced logical data stream to present the content stream to the client according to the input command.

38. A method as in claim 37, wherein the input from the client indicates to fast forward presentation of data content in the enhanced logical data stream to the client.

39. A method as in claim 37, wherein the input from the client indicates to rewind presentation of data content in the enhanced logical data stream to the client.

40. A method as in claim 28 further comprising:
utilizing the metadata stored in the enhanced logical data stream to determine whether to suppress playing back an audio signal of the content stream.

41. A method as in claim 28, wherein the content stream includes commercials that are substantially presented in real time to the client regardless of input from the client.

42. A system for presenting data content to a client, the system comprising:
a stream processor to retrieve from storage an enhanced logical data stream including a multimedia data stream for a single program, wherein the multimedia data stream is a time based sequence of packets encoded according to a first content format, and wherein the multimedia data stream includes data content, and metadata, the data content arranged as a series of groups, each group including related data content, and the metadata associated with each of at least one of the groups, the metadata of the enhanced logical data stream including information enabling manipulation of how the data content of the enhanced logical data stream is presented to the client, the stream processor generating a content stream including the data content depending on input from the client device indicating how to present the data content to the client, wherein the information enabling manipulation includes:
time stamps received for each of the packets in the respective group that correspond to a normal playback of the multimedia data stream,
one or more time stamp offsets corresponding to one or more groups in the multimedia data stream, a time stamp offset identifying where the one or more groups reside relative to the respective presentation group, and a pointer to an access point for each group, the access point including timing data in the data content wherein the pointer identifies a position of the respective group throughout the multimedia data stream relative to a position of at least one other group in the first content, the access point including timing data in the first content,
- wherein the one or more time stamp offsets and the pointer to the group's access point at least in part represent the group's dependencies on one or more other groups within the multimedia data stream; and
- wherein a plurality of private transport packets generated for a plurality of groups in the multimedia data stream are navigable for modifying the normal playback of the multimedia data stream based on group dependencies;
- a memory device to at least temporarily store the enhanced logical data stream for processing.

43. A system as in claim 42, wherein the metadata: i.) supports navigation among different portions of the logical data stream in response to commands received from remote users each playing back at least a portion of the logical data stream substantially in real-time; and ii.) enables serial streaming of non-contiguous portions of the logical data stream in response to commands from remote users requesting presentation of the logical data stream in a different manner than originally supported by a content format of the logical data stream.

44. A system as in claim 42, wherein the stream processor streams first portions of the enhanced logical data stream for presentation of corresponding data content to the client while simultaneously streaming a second, different portions of the logical data stream for presentation of corresponding data content to another client.

45. A system as in claim 42, wherein the stream processor utilizes time stamp information stored in the metadata to present the content stream to the client with respect to a real-time clock.

46. A system as in claim 42, wherein the stream processor utilizes offset information stored as metadata to locate time stamps in the enhanced logical data stream for presenting the content stream to the client.

47. A method as in claim 42, wherein the stream processor removes a substantial portion of the metadata from the enhanced logical data stream to produce the content stream including data content presented to the client.

48. A system as in claim 42, wherein the metadata includes pointers interleaved with the data content of the enhanced logical data stream, the pointers identifying portions of the enhanced logical data stream including other metadata.

49. A system as in claim 48, wherein the pointers support navigation of the enhanced logical data stream and manipulation of how the data content of the enhanced logical data stream is presented to the client.

50. A system as in claim 42, wherein the stream processor retrieves one of multiple enhanced logical data streams from storage for a substantially real-time presentation of the content stream to the client.

51. A system as in claim 42, wherein the stream processor receives an input command from the client identifying a presentation mode for receiving the data content at the client and utilizes pointers stored in specified data fields of the enhanced logical data stream to present the content stream to the client according to the input command.

52. A system as in claim 51, wherein the input from the client indicates to fast forward presentation of data content in the enhanced logical data stream to the client.

53. A system as in claim 51, wherein the input from the client indicates to rewind presentation of data content in the enhanced logical data stream to the client.

54. A system as in claim 42, wherein the stream processor utilizes the metadata stored in the enhanced logical data stream to determine whether to suppress playing back an audio signal of the content stream.

55. A system as in claim 42, wherein the content stream includes commercials that are substantially presented in real time to the client regardless of input from the client.

56. A computer program product including a non-transitory computer-readable medium having instructions stored thereon for processing data information, such that the instructions, when carried out by a processing device, enable the processing device to perform the steps of:
- analyzing portions of a logical data stream including data content received as a multimedia data stream for a single program, wherein the multimedia data stream is a time based sequence of packets encoded according to a first content format, to detect groups of the data content, each group defining a presentation of the logical data stream, and to determine an access point for each group, the access point including timing data in the logical data stream; and
- based on the analyzing, generating metadata for each of at least one of the groups of the data content, the metadata including:
  - time stamps received for each of the packets in the respective presentation group that correspond to a normal playback of the multimedia data stream,
  - one or more time stamp offsets corresponding to one or more presentation groups in the multimedia data stream, a time stamp offset identifying where the one or more presentation groups reside relative to the respective presentation group, and
  - a pointer to the access point determined for the respective presentation group, wherein the pointer identifies a position of the respective presentation group throughout the multimedia data stream relative to a position of at least one other presentation group in the first content,
  - wherein the one or more time stamp offsets and the pointer to the presentation group's access point at least in part represent the presentation group's dependencies on one or more other presentation groups within the multimedia data stream,
  - wherein the metadata is embedded in the logical data stream being used to support manipulation of presenting the logical data stream when the logical data stream is later presented to a receiver for play back, the metadata navigable for modifying the normal playback of the multimedia data stream based on presentation group dependencies.

57. A system to process data content in a logical data stream, the system comprising:
- a buffer to at least temporarily store portions of the logical data stream received as a multimedia data stream for a single program, wherein the multimedia data stream is a time based sequence of packets encoded according to a first content format; and
- means for analyzing portions of the logical data stream received to detect groups of the logical data stream, each group defining a presentation of the logical data stream, and to determine an access point for each group, the access point including timing data in the logical data stream, the analyzing means generating metadata for each of at least one of the groups of the logical data stream, the metadata including:
  time stamps received for each of the packets in the respective presentation group that correspond to a normal playback of the multimedia data stream,
  one or more time stamp offsets corresponding to one or more presentation groups in the multimedia data stream, a time stamp offset identifying where the one or more presentation groups reside relative to the respective presentation group, and
  a pointer to the access point determined for the respective presentation group, wherein the pointer identifies a position of the respective presentation group throughout the multimedia data stream relative to a position of at least one other presentation group in the first content,
  wherein the one or more time stamp offsets and the pointer to the presentation group's access point at least in part represent the presentation group's dependencies on one or more other presentation groups within the multimedia data stream,
  wherein the metadata is embedded in the logical data stream being used to support manipulation of presenting the logical data stream when the logical data stream is later presented to a receiver, the metadata navigable for modifying the normal playback of the multimedia data stream based on presentation group dependencies.

58. A computer program product including a non-transitory computer-readable medium having instructions stored thereon for processing data information, such that the instructions, when carried out by a processing device, enable the processing device to perform the steps of:
  retrieving an enhanced logical data stream a multimedia data stream for a single program, wherein the multimedia data stream is a time based sequence of packets encoded according to a first content format, and wherein the multimedia data stream includes data content, and metadata, the data content arranged as a series of groups, each group including related data content, and the metadata associated with each of at least one of the groups, the metadata including information enabling manipulation of how the data content of the enhanced logical data stream is presented to the client device, wherein the information enabling manipulation includes:
    time stamps received for each of the packets in the respective group that correspond to a normal playback of the multimedia data stream,
    one or more time stamp offsets corresponding to one or more groups in the multimedia data stream, a time stamp offset identifying where the one or more groups reside relative to the respective presentation group, and
    a pointer to an access point for each group, the access point including timing data in the data content wherein the pointer identifies a position of the respective group throughout the multimedia data stream relative to a position of at least one other group in the first content, the access point including timing data in the first content,
  wherein the one or more time stamp offsets and the pointer to the group's access point at least in part represent the group's dependencies on one or more other groups within the multimedia data stream;
  generating a content stream including the data content depending on input from the client device indicating how to present the data content, wherein multiple private transport packets generated for a plurality of groups in the multimedia data stream are navigable for fast-forwarding or rewinding playback of the multimedia data stream based on group dependencies without requiring searching for individual packet timestamps of the multimedia data stream; and
  presenting the content stream to the client.

59. A system for presenting data content to a client, the system comprising:
  means for retrieving from storage an enhanced logical data stream including a multimedia data stream for a single program, wherein the multimedia data stream is a time based sequence of packets encoded according to a first content format, and wherein the multimedia data stream includes data content, and metadata, the data content arranged as a series of groups, each group including related data content, and the metadata associated with each of at least one of the groups, the metadata of the enhanced logical data stream including information enabling manipulation of how the data content of the enhanced logical data stream is presented to the client, the retrieving means generating a content stream including the data content depending on input from the client device indicating how to present the data content to the client, wherein the information enabling manipulation includes:
    time stamps received for each of the packets in the respective group that correspond to a normal playback of the multimedia data stream,
    one or more time stamp offsets corresponding to one or more groups in the multimedia data stream, a time stamp offset identifying where the one or more groups reside relative to the respective presentation group, and
    a pointer to an access point for each group, the access point including timing data in the data content wherein the pointer identifies a position of the respective group throughout the multimedia data stream relative to a position of at least one other group in the first content, the access point including timing data in the first content,
  wherein the one or more time stamp offsets and the pointer to the group's access point at least in part represent the group's dependencies on one or more other groups within the multimedia data stream; and
  wherein a plurality of private transport packets generated for a plurality of groups in the multimedia data stream are navigable for modifying the normal playback of the multimedia data stream based on group dependencies;
  a memory device to at least temporarily store the enhanced logical data stream for processing.

60. A method for processing a digital data stream for seamless playback, the method comprising:
  a) receiving a packetized digital data stream that includes a multimedia data stream for a single program and supports playback in a first manner, said data stream including a plurality of presentation groups, each presentation group defining a presentation of the data stream;
  b) analyzing said packetized digital data stream to obtain information on said packetized digital data stream, said information including:
    time stamps received for each of the packets in the respective group that correspond to a normal playback of the multimedia data stream,
    one or more time stamp offsets corresponding to one or more groups in the multimedia data stream, a time stamp offset identifying where the one or more groups reside relative to the respective presentation group, and a pointer to an access point for each group, the access point including timing data in the data content, wherein the pointer identifies a position of the respective group throughout the multimedia data stream relative to a position of at least one other group in the first content, the access point including timing data in the first content, wherein the one or more time stamp offsets and the pointer to the group's access point at least in part represent the group's dependencies on one or more other groups within the multimedia data stream, c) generating a Private Transport Packet (PTP) for each of at least one of said presentation groups, each PTP based on said information obtained for the respective presentation group;

d) embedding the PTPs in said packetized digital data stream; and e) upon receipt of a request from a client, transmitting the packetized digital data stream to the client in a second manner, utilizing said PTPs to create said second manner, enabling the client to play back the packetized digital data stream, said second manner being different from said first manner, wherein a plurality of private transport packets generated for a plurality of presentation groups in the multimedia data stream are navigable for modifying the normal playback of the multimedia data stream based on presentation group dependencies.

61. A method for processing a digital data stream as in claim 60, wherein each of said private transport packets includes metadata, said metadata being associated with multiple analyzed portions of the data stream, said metadata being used to support manipulation of presenting the data stream.

62. A method for processing a digital data stream as in claim 61, wherein said metadata: i) supports navigation among different portions of the data stream in response to commands received from a client each playing back at least a portion of the data stream substantially in real-time; and ii) enables serial streaming of non-contiguous portions of the data stream in response to commands from a client requesting presentation of the data stream in a manner different than originally supported by a content format of the data stream.

63. A method for processing a digital data stream as in claim 60, wherein the step of d) embedding of the PTPs in said packetized digital stream further comprises:

embedding the PTPs to precede the corresponding presentation groups in said data stream.

64. A method for processing a digital data stream as in claim 60, wherein said PTP includes navigation data, said navigation data including pointers to other PTPs.

* * * * *